US010875668B2

(12) United States Patent
Bigras et al.

(10) Patent No.: US 10,875,668 B2
(45) Date of Patent: Dec. 29, 2020

(54) SATELLITE SYSTEM AND METHOD FOR GLOBAL COVERAGE

(71) Applicant: Telesat Canada, Ottawa (CA)

(72) Inventors: Andre E Bigras, Ottawa (CA); Peter Megyeri, Ottawa (CA); Jack Rigley, Ottawa (CA); Alireza Shoamanesh, Ottawa (CA); Paul Ng, Manotick (CA); Surinder Pal Singh, Ottawa (CA)

(73) Assignee: TELESAT CANADA, Ottowa (CA)

( * ) Notice: Subject to any disclaimer, the term of this patent is extended or adjusted under 35 U.S.C. 154(b) by 137 days.

(21) Appl. No.: 14/953,154

(22) Filed: Nov. 27, 2015

(65) Prior Publication Data

US 2016/0137317 A1 May 19, 2016

Related U.S. Application Data

(63) Continuation-in-part of application No. 13/876,678, filed as application No. PCT/CA2011/001093 on Sep. 30, 2011, now Pat. No. 9,344,182.

(30) Foreign Application Priority Data

Oct. 1, 2010 (CA) ..................... 2716174

(51) Int. Cl.
*B64G 1/10* (2006.01)
*B64G 1/24* (2006.01)
(Continued)

(52) U.S. Cl.
CPC ........... *B64G 1/1085* (2013.01); *B64G 1/242* (2013.01); *B64G 1/002* (2013.01); *B64G 1/105* (2013.01);
(Continued)

(58) Field of Classification Search
CPC .... B64G 1/1085; B64G 1/242; B64G 1/1007; B64G 1/1021; B64G 1/105;
(Continued)

(56) References Cited

U.S. PATENT DOCUMENTS 4,502,051 A * 2/1985 Dondl .................. B64G 1/1007
342/356
4,809,935 A 3/1989 Draim
(Continued)

FOREIGN PATENT DOCUMENTS

| CN | 1190297 A | 8/1998 |
| CN | 1270304 A | 10/2000 |

(Continued)

OTHER PUBLICATIONS

International Search Report dated Nov. 8, 2011 in PCT/CA2011/001093.
(Continued)

*Primary Examiner* — Magdalena Topolski
(74) *Attorney, Agent, or Firm* — Young Law Firm, P.C.

(57) ABSTRACT

A non-geostationary satellite system and method for weather and climate monitoring, communications applications, scientific research, and similar tasks. The satellite system provides global coverage using a constellation of six satellites in two orthogonal, 24 sidereal hour orbits (geosynchronous) with inclinations of 70° to 90°, and eccentricities of 0.275-0.45. By placing three of the satellites in a first orbit with an apogee over the north pole, and three of the satellites in a second, orthogonal orbit with an apogee over the south pole, global coverage may be obtained. As well, the satellites in these orbits avoid most of the Van Allen Belts.

26 Claims, 29 Drawing Sheets

(51) Int. Cl.
*B64G 1/00* (2006.01)
*B64G 1/64* (2006.01)

(52) U.S. Cl.
CPC .......... *B64G 1/1007* (2013.01); *B64G 1/1021* (2013.01); *B64G 2001/1042* (2013.01); *B64G 2001/643* (2013.01)

(58) Field of Classification Search
CPC ............ B64G 2001/1042; H04B 7/185; H04B 7/18513; H04B 7/18563
See application file for complete search history.

(56) References Cited

U.S. PATENT DOCUMENTS

| | | | |
|---|---|---|---|
| 4,854,527 A * | 8/1989 | Draim | B64G 1/1007 244/158.4 |
| 5,619,211 A | 4/1997 | Horkin | |
| 6,267,329 B1 * | 7/2001 | Chethik | B64G 1/1007 244/158.4 |
| 6,328,264 B1 | 12/2001 | Maeda | |
| 6,333,924 B1 | 12/2001 | Porcelli | |
| 6,501,941 B1 * | 12/2002 | Chang | H04B 7/18519 455/13.1 |
| 6,564,053 B1 * | 5/2003 | Briskman | H04B 7/195 244/158.4 |
| 6,633,745 B1 | 10/2003 | Bethscheider | |
| 6,695,259 B1 | 2/2004 | Maeda | |
| 6,764,049 B1 | 7/2004 | Maeda | |
| 9,075,140 B2 | 7/2015 | Garrison | |
| 2001/0014842 A1 | 8/2001 | Cellier | |
| 2002/0082776 A1 | 6/2002 | Castiel | |
| 2002/0177403 A1 | 11/2002 | LaPrade et al. | |
| 2003/0114102 A1 | 6/2003 | Golding | |
| 2003/0189136 A1 | 10/2003 | Maeda | |
| 2004/0056146 A1 * | 3/2004 | Goodzeit | B64G 1/1085 244/10 |
| 2008/0155610 A1 | 6/2008 | Rosen | |
| 2017/0043885 A1 * | 2/2017 | Marchandise | B64G 1/007 |

FOREIGN PATENT DOCUMENTS

| | | |
|---|---|---|
| DE | 3334241 A1 | 4/1985 |
| EP | 0959573 A2 | 11/1999 |
| EP | 1471664 A2 | 10/2001 |
| EP | 1720266 A1 | 11/2006 |
| JP | 2000115050 A | 4/2000 |
| JP | 2001111468 A | 4/2001 |
| JP | 2001506465 A | 5/2001 |
| JP | 2003298488 A | 10/2003 |
| JP | 5268131 B2 | 3/2009 |
| JP | 2009227019 A | 10/2009 |
| WO | 03/061141 A2 | 7/2003 |

OTHER PUBLICATIONS

International Preliminary Report on Patentability dated Apr. 2, 2013 in PCT/CA2011/001093.
Chobotov, Vladimir A., Orbital Mechanics (3rd Edition), American institute of Aeronautics and Astronautics, 2002, ISBN: 978-1-56347-537-5, pp. 411-452.
Ley, Wilfried, Wittmann, Klaus, Hamann, Willi, Handbook of Space Technology, John Wiley & Sons, 2009, ISBN: 978-0-470-69739-9, pp. 534-546.
Griffin, Michael D., French, James R., Space Vehicle Design (2nd Edition). American Institute of Aeronautics and Astronautics, 2004, ISSN: 978-1-56347-539-9, pp. 17 to 47.
English Translation of Office Action dated on or about Jan. 5, 2013 in Pakistan patent application 712/2011.
First Examination Report dated Dec. 10, 2013 from the New Zealand Intellectual Property Office in related application, IP No. 608940.
Notification of the First Office Action dated Dec. 3, 2014, The Patent Office of the People's Republic of China in related CN application 201180047754.7—Original and English language translation.
USPTO Office Action dated Mar. 31, 2015 in U.S. Appl. No. 13/876,678.
USPTO Notice of Allowance dated Nov. 2, 2015 is U.S. Appl. No. 13/876,678.
"The case for launching a meteorological imager in a Molniya orbit" by Lars Peter Riishojgaard, World Meteorological Organization Commission for Basic Systems OPAG on Integrated Observing Systems Expert Team on Observational Data Requirements and Redesign of the Global Observing System Seventh Session Geneva, Switzerland, Jul. 12-16, 2004.
USPTO Notice of Allowance dated Feb. 26, 2016 in U.S. Appl. No. 13/876,678.
English language translation of JP Office Action dated Aug. 22, 2017 in JP patent application 2016-194578.
EPO Supplementary Search Report dated Sep. 5, 2016 in application EP 11 82 7855.

* cited by examiner

SATELLITE SYSTEM AND METHOD FOR GLOBAL COVERAGE

CROSS-REFERENCE TO RELATED APPLICATIONS

The present application is a continuation-in-part of commonly-assigned and co-pending prior application Ser. No. 13/876,678, filed Sep. 9, 2013, which is a § 371 US National Phase application of PCT/CA2011/001093 filed on Sep. 30, 2011, which claims priority to CA 2,716,174 filed on Oct. 1, 2010, which applications are hereby incorporated herein in their entirety and from which priority is hereby claimed under 35 U.S.C. §§ 119 and 120.

FIELD OF INVENTION

The present invention relates to satellite systems and more particularly, to the provision of a novel, non-geostationary satellite system and method for weather and climate monitoring, communications applications, air traffic management (ATM), scientific research and similar tasks, with global coverage.

BACKGROUND OF THE INVENTION

Meteorological monitoring satellites and communications satellites are usually located in Geostationary Earth Orbit—(GEO) or Low Earth Orbit (LEO). GEO satellites appear to be motionless in the sky, providing the satellite with a continuous view of a given area on the surface of the Earth. Unfortunately, such an orbit can only be obtained by placing the satellite directly above the Earth's equator (0° latitude), with a period equal to the Earth's rotational period, an orbital eccentricity of approximately zero and at an altitude of 35,789 km. While such orbits are useful in many applications, they are very poor at covering higher latitudes (not very useful above 60° latitude for weather and climate monitoring, or above 70° latitude for reliable mobile communications). The optical sensors on a GEO meteorological monitoring satellite, for example, would view higher latitudes at such a poor angle (i.e. a low "elevation angle") that it could not collect useful data. GEO communications satellite links also become unreliable or fail as the elevation angle to the satellite decreases with increasing latitude.

LEO satellites are placed in circular orbits at low altitudes (less than 2,000 km) and can provide continuous global coverage but this requires many satellites as each satellite is over a given region for a relatively small amount of time. One operational example of a LEO system is the Iridium system which uses a constellation of 66 satellites. While practical for relatively low bandwidth communications, it is not cost effective for broadband communications or for weather and climate monitoring which require large and expensive payloads to be placed on each satellite. In view of the cost of building, launching and maintaining each satellite a LEO constellation is a very expensive way of providing continuous global satellite coverage.

Highly Elliptical Orbits (HEO) such as the Molniya and the classic Tundra orbits can provide better converge of high latitudes with fewer satellites, but both orbits are problematic.

HEO satellites are those in which one of the foci of the orbit is the centre of the Earth. The speed of a satellite in an elliptical orbit is a declining function of the distance from the focus. Arranging the satellite to travel close to the Earth during one part of its orbit (the perigee) will cause it to travel very quickly at that time, while at the other end of the orbit (the apogee), it will travel very slowly. A satellite placed in these orbits spends most of its time over a chosen area of the Earth, a phenomenon known as "apogee dwell". The orbit is designed so that the satellite moves relatively slowly over the areas of interest, and quickly over areas that are not of interest.

The orbital plane of a HEO is inclined with respect to the Earth's equator. An inclination close to 63.4° is typically chosen in order to minimize the requirement for the satellite on-board propulsion system to maintain the apogee above the service area. That is, an orbit with an inclination of 63.4° will have zero precession of the major axis of the orbit, so the apogee remains fixed above the northern hemisphere. With any inclination other than 63.4° degrees, the argument of perigee will change over time, which is generally undesirable.

The Molniya orbit is a HEO with an orbital period of approximately 12 hours. The altitude at the perigee of a Molniya orbit is low (on the order of 500 km above the Earth's surface) and the orbit passes through the Van Allen Belts. The Van Allen Belts are belts of energetic charged particles (plasma) around the Earth, which are held in place by Earth's magnetic field. Solar cells, integrated circuits and sensors are damaged by the radiation levels in these belts, even if they are "hardened" or other safety measures are implemented, for example, turning sensors off when passing through regions of intense radiation. Despite these efforts, satellites which may otherwise have a 15 year expected life will only have about a 5 year life if they have to travel regularly through the inner Van Allen belt of high energy protons (the outer belt of electrons is less problematic). This shortened life of satellites makes Molniya systems very expensive.

The classic Tundra orbit is also a Highly Elliptical Orbit, with the same inclination as Molniya (63.4°). It is also a geosynchronous orbit with an orbital period of one sidereal day (approximately 24 hours). The only operational system in Tundra orbit is Sirius Satellite Radio, which operates a constellation of three satellites in different planes, each satellite plane being offset by 120°, to provide the coverage they desire for their broadcast radio system. The three-satellite constellation used by Sirius Satellite Radio covers a relatively small area (the United States), so this strategy would clearly be impractical for global coverage.

Even in view of the problems with the Molniya (short design life) and the classic Tundra systems (requiring a large number of satellites for global coverage), the experts in the field support the use of these systems in such applications. For example:

A current NASA paper ("*The case for launching a meteorological imager in a Molniya orbit*" by Lars Peter Riishojgaard, Global Modeling and Assimilation Office), asserts that the most effective way of providing a satellite system for meteorological monitoring at higher latitudes, is to use a Molniya system:
http://www.wmo.int/pages/prog/www/OSY/Meetings/ODRRGOS-7/Doc7-5(1).pdf A European Space Agency paper ("HEO for ATM; SATCOM for AIR TRAFFIC MANAGEMENT by HEO satellites", Final Report, 2007) concludes that a Tundra orbit would take more satellites than Molniya, for coverage of northern latitudes for Air Traffic Management (ATM) applications; and A presentation at International Communications, Navigations and Surveillance Conference, 2009, "*SATCOM for ATM in High Latitudes*", Jan Erik Hakegard, Trond Bakken, Tor Andre Myrvoll, concludes that three satellites in Tundra orbit would be required for ATM at high latitudes. See:
http://i-cns.org/mediai2009/05/presentations/Session_K_Communications_FCS/01-Hakegard.pdf Finally, various other attempts have been made to design constellation systems which provide global coverage with small numbers of satellites, such as those described in U.S. Pat. Nos. 4,809,935 and 4,854,527. These exotic designs suffer from various shortcomings which make them unworkable. For example, the constellation described in U.S. Pat. No. 4,809,935 requires four satellites to be in different orbital planes, meaning that all four satellites would have to be launched separately, and that the failure of one satellite would have a dramatic effect on the coverage. As well, because U.S. Pat. No. 4,809,935 requires a 72-hour orbital period to be used, the apogees of the satellites would have to be so high as to be impractical (i.e. in the vicinity of 150,000 km). And while U.S. Pat. No. 4,854,527 describes a system which provides global coverage, it only provides a minimum elevation angle of 2°, which is not useful in either communications or Earth observation applications.

There is therefore a need for an improved satellite system and methods for providing global coverage, particularly for meteorological monitoring and communications applications.

SUMMARY OF THE INVENTION

It is an object of the invention to provide an improved satellite system and methods for providing continuous coverage of the circumpolar region, which mitigates upon the problems described above.

Contrary to the teachings in the art it has been determined that a satellite system and method may be provided using satellites in two orthogonal, 24 sidereal hour orbits (geosynchronous) with inclinations, orbital planes, right ascensions and eccentricities chosen to optimize global coverage. Specifically, it has been discovered that a constellation of six satellites, with three satellites in each of the two orthogonal orbital planes, can provide continuous global coverage with acceptable elevation angles. The satellites' orbits avoid the inner Van Allen belt of high energy protons and can achieve a design life of 15 years or greater.

In one embodiment of the invention there is provided a satellite system for Earth observation and communications, comprising: a constellation of six satellites, three of the satellites orbiting in a first orbit and the other three of said satellites orbiting in a second orbit; the first orbit having an orbital inclination approximately between 70° and 90° and an apogee over the northern hemisphere, and an orbital eccentricity approximately between 0.275 and 0.45; the second orbit having an orbital inclination approximately between 70° and 90° and an apogee over the southern hemisphere, and an orbital eccentricity approximately between 0.275 and 0.45; the first orbit and the second orbit planes being substantially orthogonal to one another; and a base station for transmitting to, and receiving signals from, the constellation of six satellites.

In another embodiment of the invention there is provided a method of operation for a satellite system satellite system for Earth observation and communications, comprising: providing a constellation of six satellites, three of said satellites orbiting in a first orbit and the other three of said satellites orbiting in a second orbit; the first orbit having an orbital inclination approximately between 70° and 90° and an apogee over the northern hemisphere, and an orbital eccentricity approximately between 0.275 and 0.45; the second orbit having an orbital inclination approximately between 70° and 90° and an apogee over the southern hemisphere and an orbital eccentricity approximately between 0.275 and 0.45; and the first orbit and the second orbit planes being substantially orthogonal to one another; and providing at least one base station for transmitting to and receiving signals from said constellation of six satellites.

In a further embodiment of the invention there is provided a satellite base station, comprising: communication means for transmitting and receiving signals to and from a constellation of six satellites; and flight control means for controlling said constellation of six satellites such that: three of said satellites orbit in a first orbit and the other three of said satellites orbit in a second orbit; the first orbit having an orbital inclination approximately between 70° and 90° and an apogee over the northern hemisphere, and an orbital eccentricity approximately between 0.275 and 0.45; the second orbit having an orbital inclination approximately between 70° and 90° and an apogee over the southern hemisphere, and an orbital eccentricity approximately between 0.275 and 0.45; and the first orbit and the second orbit planes are substantially orthogonal to one another.

Thus, embodiments of the invention provide a satellite constellation with continuous global coverage, six satellites providing continuous global coverage at a minimum elevation angle of 8.7° and global coverage for 20 hours per day at a minimum of 20° elevation. The system also provides for graceful degradation in the event that one or even two satellites in the constellation fail.

Other aspects and features of the present invention will be apparent to those of ordinary skill in the art from a review of the following detailed description when considered in conjunction with the drawings.

BRIEF DESCRIPTION OF THE DRAWINGS

These and other features of the invention will become more apparent from the following description in which reference is made to the appended drawings wherein.

Similar reference numerals have been used in different figures to denote similar components.

DETAILED DESCRIPTION

Contrary to the teachings in the art it has been determined that a satellite system and method may be provided using satellites in two orthogonal, 24 sidereal hour orbits (geosynchronous) with inclinations, orbital planes, right ascensions and eccentricities chosen to provide global coverage. A constellation of six satellites can provide continuous global coverage with a minimum elevation angle of 8.7°. The satellites in the two orbits which are described, avoid the inner Van Allen belt of high energy protons.

Figure 1:
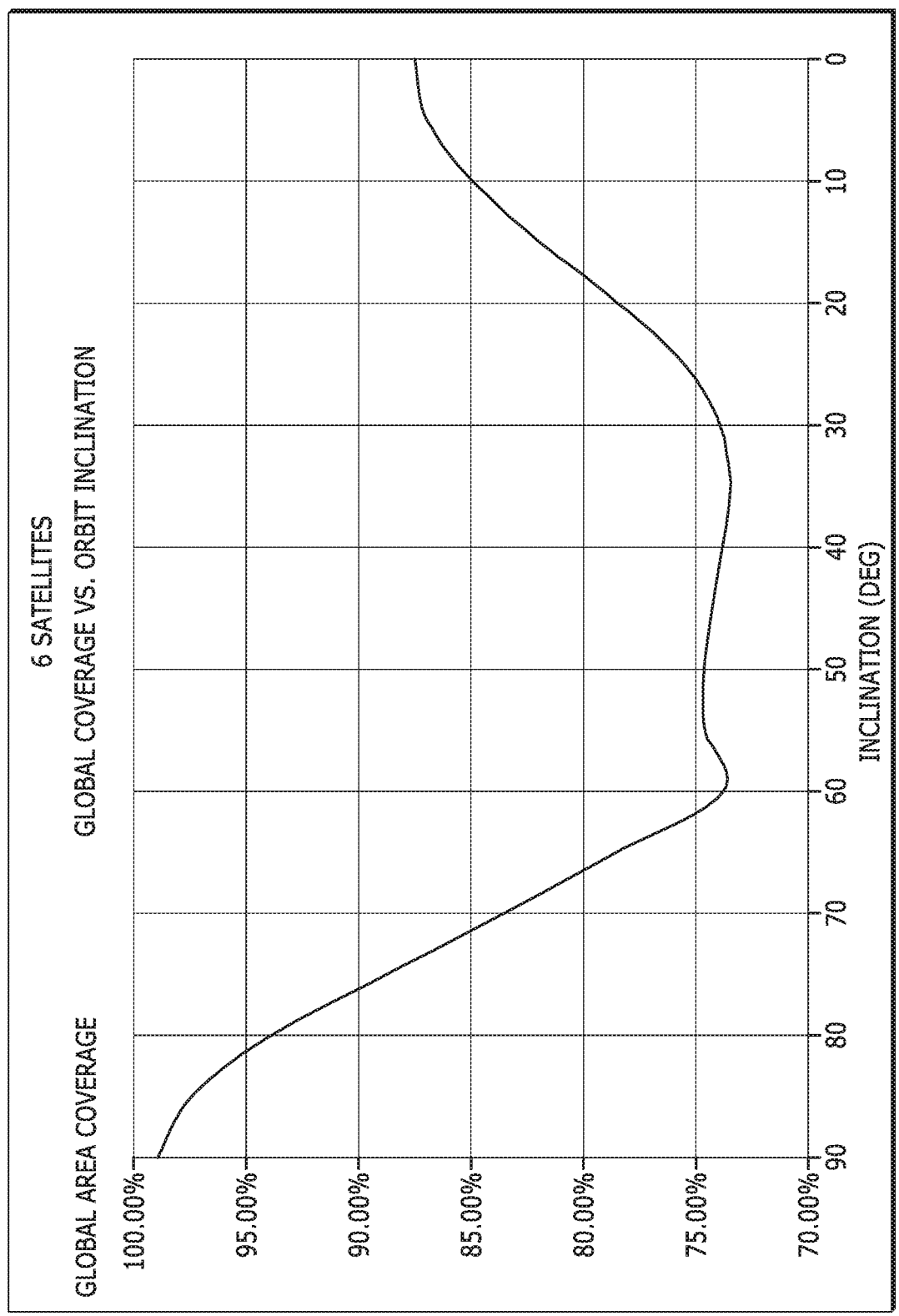
FIG. 1 shows the output plot of a satellite orbit software tool, indicating the percentage of global coverage that can be provided with the six satellite constellation having orbital planes arranged at different inclinations, providing a minimum 10° elevation angle. In this example the best coverage is provided at a 90° inclination, while an 80° inclination still provides 94% global coverage. Note that the traditional Molniya and Tundra orbits at 63.4° inclination provide almost the poorest coverage (about 75°).

For example, as shown in FIG. 1, a constellation of six satellites at a 90° inclination and 0.3 eccentricity, will provide a minimum 10° elevation angle for 99% global coverage. Any deviation from the 90° inclination cases a dramatic drop in global coverage, particularly below 80°. Interestingly, the commonly accepted standard inclination of 63.4°, used by both the Molniya and Tundra systems, has almost the poorest level of global coverage for a six-satellite constellation. The "elevation angle" refers to the line-of-sight angle between the ground and the satellite as measured from the horizon. The minimum elevation angle that communication instruments must have is typically in the vicinity of 10°, particularly for mobile communications. Other exemplary embodiments of the invention are described hereinafter.

Figure 2:
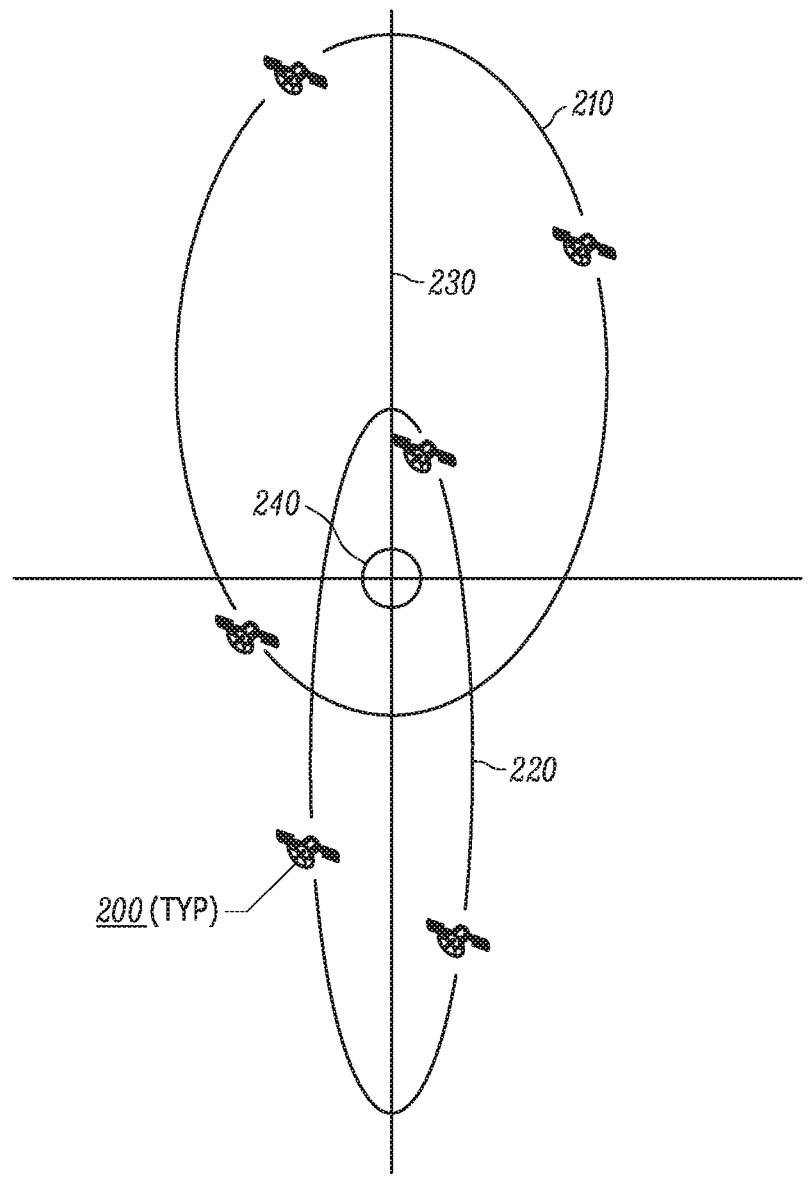
FIG. 2 shows six satellites in an exemplary pair of orthogonal, 24 hour elliptical orbits, inclined 90°. The three satellites that are in the same plane are separated by approximately 8 hours.

Although the satellite system described herein is a HEO-type system, it is strikingly different from a Tundra system, for example. The classic Tundra system does not provide global coverage, or continuous coverage of the circumpolar regions. By increasing the eccentricity, causing a higher apogee, and using six satellites in two orthogonal orbital planes, the global coverage requirement may be met. However, greater altitude above the coverage area requires larger antennas and sensors on the satellite. More importantly, the perigee is lowered causing the satellites to pass through a greater portion of the Van Allen belts, reducing their operational life. It is only by modifying both the eccentricity and the inclination, that one is able to provide the desired global and circumpolar coverage at a reasonable altitude, with minimal exposure to the Van Allen belts. Other parameters of the system are as follows:

Inclination: The inclination is the angle between the orbital plane of the satellites, and the plane that passes through the Earth's equator. The inclination may only be slightly greater than 63.4° in some embodiments but is between 80° and 90° for most applications requiring complete global and circumpolar coverage. FIG. 2 shows a simplified diagram of six satellites 200 in two orthogonal planes. To optimise coverage, each satellite 200 in a given orbital path, in a 24 hour HEO orbit with an inclination of 90°, is phased such that a satellite will appear at apogee (and perigee) 8 hours apart. Both orbital paths 210, 220 share the same primary axis 230 passing through the geographic poles of the Earth 240, though of course the two orbital paths 210, 220 have opposite arrangements of perigee and apogee. That is, one orbital path 210 has an apogee in the northern hemisphere, with perigee in the southern hemisphere, while the other orbital path 220 has an apogee in the southern hemisphere, with perigee in the northern hemisphere. Note that all references to 'north pole' and 'south pole' in this document are referring to the geographic north and south pole, and not to the magnetic north and south pole.

Eccentricity: The eccentricity is the shape of the elliptical path of the satellites, which dictates the altitude of the apogee (the highest altitude) and the perigee (the lowest altitude). The eccentricity is chosen to have a sufficiently high apogee over the service area so the satellites are able to provide the necessary coverage for the required period of its orbit. Higher eccentricity increases the altitude of the apogee, which must be overcome with greater power, antenna gain or larger optics on the satellite. Higher eccentricities (above approximately 0.34), also increase exposure to the Van Allen belts as they lower the altitude for the perigee.

Figure 3:
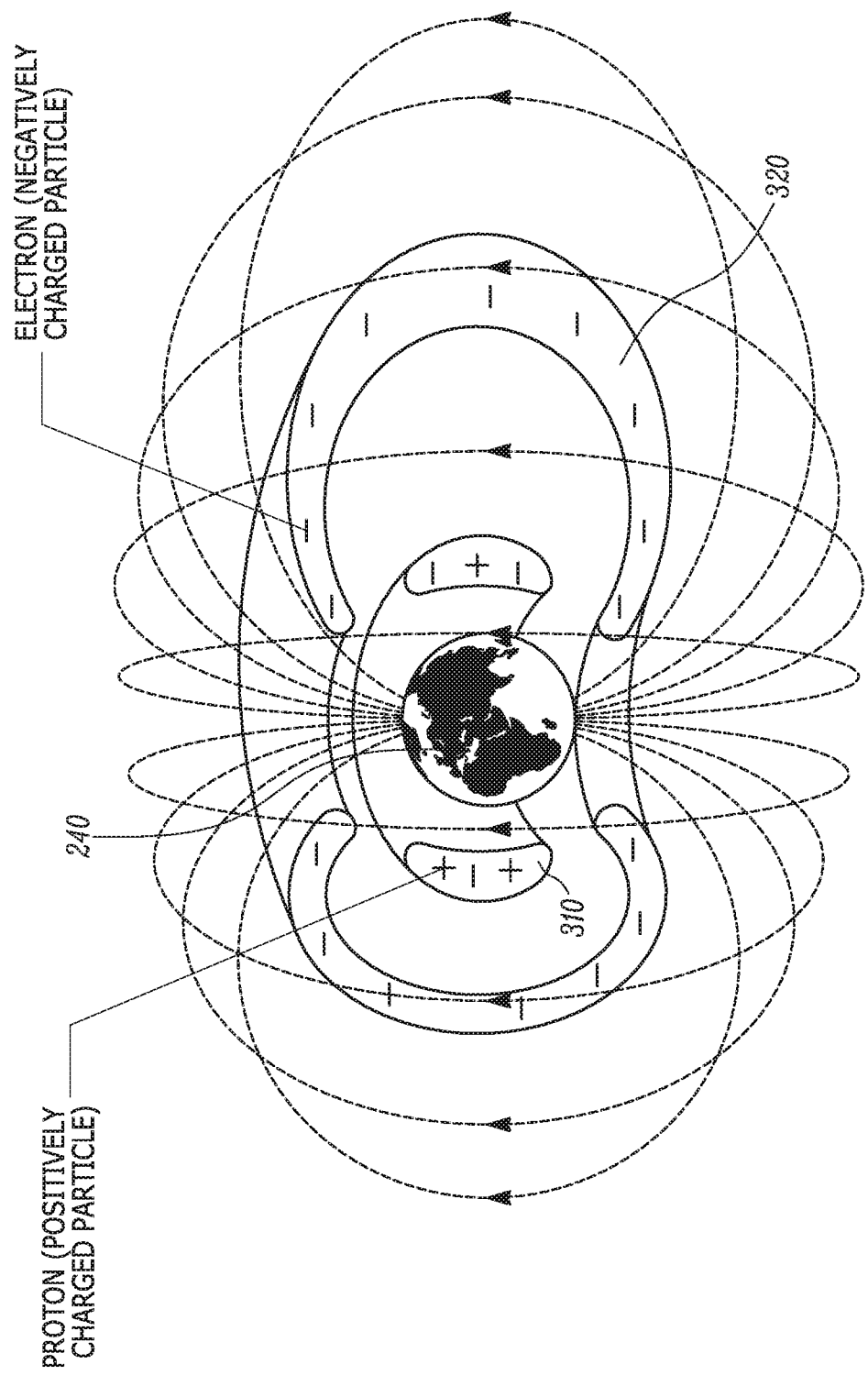
FIG. 3 is a simplified diagram of the Van Allen radiation belts, indicating the inner proton belt and the outer electron belt.

Altitude: It is desirable to have as low an apogee as possible above the coverage area as increased range negatively impacts the required power and/or sensitivity of the satellite instruments. At the perigee of course, a sufficiently high altitude must be achieved to minimize exposure to the Van Allen Belts. As shown in FIG. 3 the Van Allen belts comprise a torus of fields around the Earth 240. The belts of greatest concern are the inner belts of charged protons 310. As will be explained, the outer belts of electrons 320 are of less concern.

Place/Number of Satellites: Two orthogonal orbital planes with three or more satellites in each orbital plane is the preferred implementation. This allows for multiple satellites launched from a single launch vehicle, or increasing the number of satellites in the same plane for redundancy and/or improved performance. For example, while only three satellites are required in a given orbital path, it may be desirable to launch a redundant fourth satellite in case one satellite fails. Because all four satellites are in the same plane, it is easy to place into proper position and activate the fourth satellite when required. This kind of redundancy cannot be done as easily in systems which use a greater number of orbital planes for their satellites, such as the Iridium LEO constellation.

Argument of Perigee: The Argument of Perigee describes the orientation of an elliptical orbit with respect to the equatorial plane of the Earth. That is, the argument of perigee is the angle between the perigee and the ascending node. For service to the north circumpolar region (e.g. latitudes greater than 60° North), the argument of the perigee is in the vicinity of 270° so that the apogee is in the northern hemisphere and the perigee is in the southern hemisphere. For service to the south circumpolar region (e.g. latitudes greater than 60° South), the argument of the perigee is in the vicinity of 90° so that the apogee is in the southern hemisphere and the perigee is in the northern hemisphere.

Longitude of the Ascending Node: In simple terms, the Longitude of the Ascending Node describes where the orbital plane crosses the Earth's equator. The Longitude of the Ascending Node becomes a factor in specifying the orbit if one wants to bias the coverage towards a subset of the circumpolar region, or to optimize a satellite's observation of the Earth for a situation with better sunlight illumination, as examples.

Orbital Period: The orbital period is preferably approximately 24 hours, but this orbit can be adjusted to provide the required coverage at periods above and below 24 hours and still achieve continuous coverage of the circumpolar region.

Ground Trace: In the preferred embodiment the three satellites with apogee in the same hemisphere are in the same orbital plane and each repeatedly follow a different ground trace. For such a three satellite system, the phasing, or spacing of the satellites in the orbital plane is such that the time between their respective apogees is approximately one third of the orbital period.

Orbit Control: Satellite constellations of the invention experience changes in the aforementioned orbital parameters over time due to the Earth's oblateness, gravitational forces of the sun and moon, and solar radiation pressure. These can be compensated by the satellite's on-board propulsion system. The manner in which this is done is described hereinafter.

Figure 4:
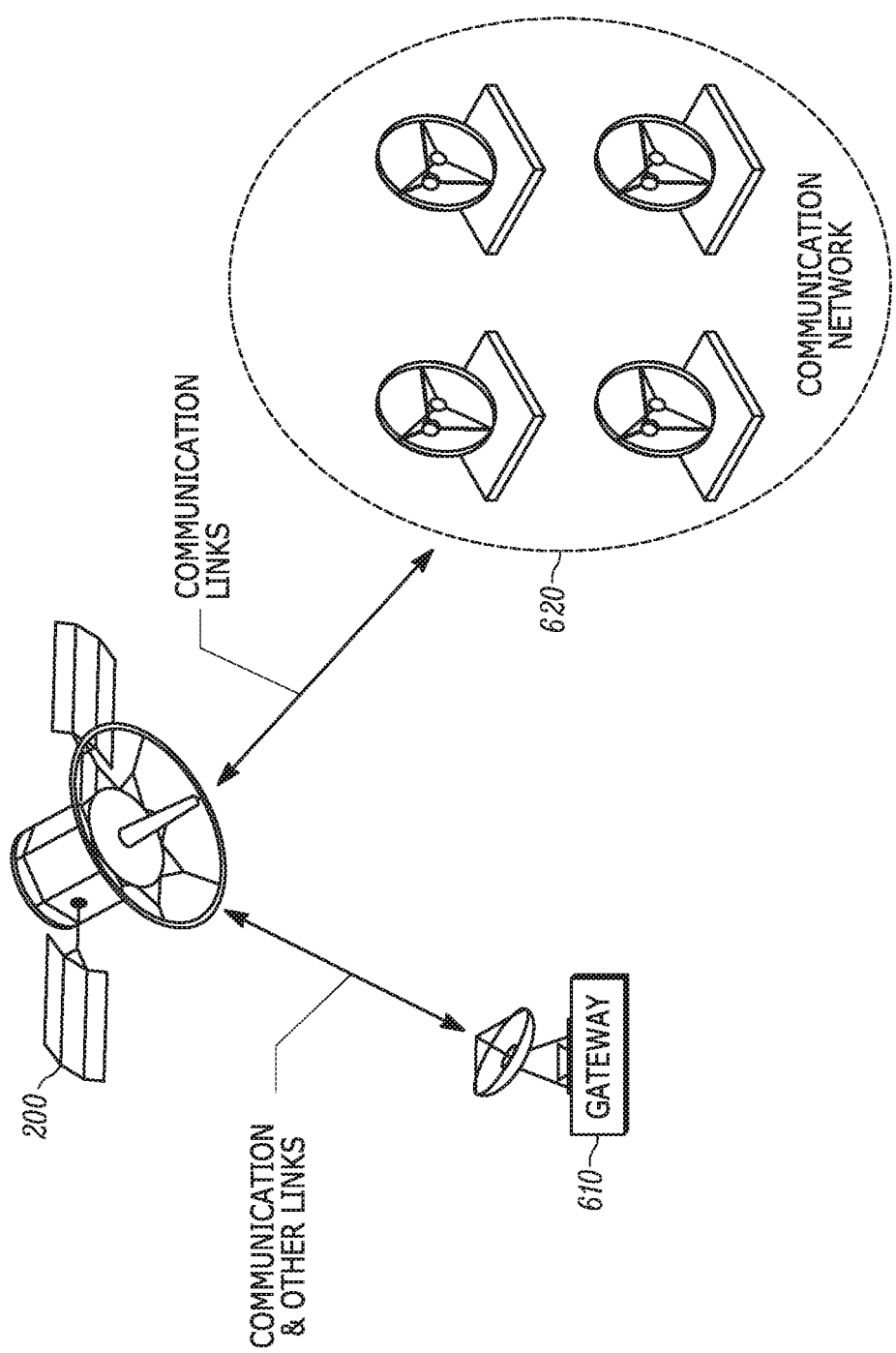
FIG. 4 presents an exemplary network architecture for implementing the invention.

Base Stations: As shown in FIG. 4, the system includes a ground based communications network 620, one or more satellites 200 with communications functionality, Earth observation and or science payloads, and at least one base station or Gateway 610. The base station or Gateway 610 is required to obtain data from the satellites 200 and to affect Telemetry, Tracking & Control (TTC). Directional antennas would be used because of their greater efficiency, requiring the base station(s) 610 to track the satellites 200 across the sky. Satellite tracking technology is well known in the art, though it would have to be modified to accommodate the six satellite system of the invention. Handoff from one satellite to the next as they move across the sky, would not require any interaction for the user. Handoff can be affected using known techniques, though those techniques would have to be optimized for this implementation.

Real time two-way communications is possible only when the satellite is mutually visible to both a Gateway 610 and an element of the ground based communication network 620. This network 620 consists of the fixed and mobile satellite terminals which communicate to the satellite. Downloading of data generated by the satellite payloads is possible only when the satellite is visible to a Gateway 610. It is feasible to increase the number of strategically placed Gateways 610 to achieve continuous links between a satellite 200 and at least one Gateway 610. The satellites 200 may also have "store and forward" functionality allowing the satellite to store SEO (Science and Earth Observation) and other data when communications to a Gateway infrastructure is not possible. The stored data can then be relayed to the ground segment when communications is possible between the satellite 200 and the Gateway 610.

Avoiding a large part of the Van Allen belts increases the design life of the satellites. By using this invention less frequent launches are required to replenish the satellite constellation and there are fewer restrictions in the design and operation of the communications, Earth observation and science payloads.

The flight dynamics (i.e. adjustments required to keep the satellite in the desired orbit) of the satellites in such a system would be different from those of other satellite systems, but the way in which these problems are handled would be much the same. That is, the flight path of the satellite could be disturbed, for example, by the gravitational pull of the moon and sun, solar radiation pressure and oblateness of the Earth. Computer software systems are known to manage other satellite flight systems and could easily be modified to accommodate the orbits described herein.

It is intended that the system initially be used in a two-way communication mode, in these satellite bands: L-Band (1-3 GHz); X band (approximately 7-8 GHz); Ku Band (approximately 11-15 GHz), and Ka Band (approximately 17-31 GHz). Error correction, encoding and re-transmission of lost/corrupted packets would also be used.

Advantages of the system include at least the following:
only six satellites are required for full global coverage, in contrast to the many more required by LEO systems for full global coverage;
this system minimizes exposure to the Van Allen Belts, giving satellites a minimum 15 year life rather than the 5 year satellite life expected in a Molniya system; and
continuous coverage of global and circumpolar regions for Earth observation and broadband communications can be provided, in contrast to GEO systems which cannot provide circumpolar coverage.

VARIOUS EMBODIMENTS

A number of different embodiments of the invention were analysed, varying the parameters of the number of satellites, orientation of apogee for the orbital paths of the satellites and the relationship between the orbital planes (i.e. the two orbital planes being co-planar or orthogonal). Exemplary embodiments are set out in Table 1 below. Although only the case of the six satellites in two orthogonal planes provides global coverage, there are many other applications in which the other embodiments or variants of those embodiments, may be quite useful.

TABLE 1

APPLICATIONS OF THE INVENTION

| | Embodiment | | | | | | |
|---|---|---|---|---|---|---|---|
| | 1 | 2 | 3 | 4 | 5 | 6 | 7 |
| Number of Satellites | 2 | 3 | 4 | 4 | 4 | 6 | 6 |
| Apogee | North Pole | North Pole | North Pole | North Pole (2) South Pole (2) | North Pole (2) South Pole (2) | North Pole (3) South Pole (3) | North Pole (3) South Pole (3) |
| Orbital Plane | Co-Planar | Co-Planar | Co-Planar | Co-Planar | Orthogonal | Co-Planar | Orthogonal |
| 24 hour coverage, 10° elevation | North of 34°N, 21.5% of globe | North of 21°N, 32% of globe | North of 18°N, 34% of globe | 57% of globe | 48% of globe | 64% of globe | 99% of globe |

Figure 5A:
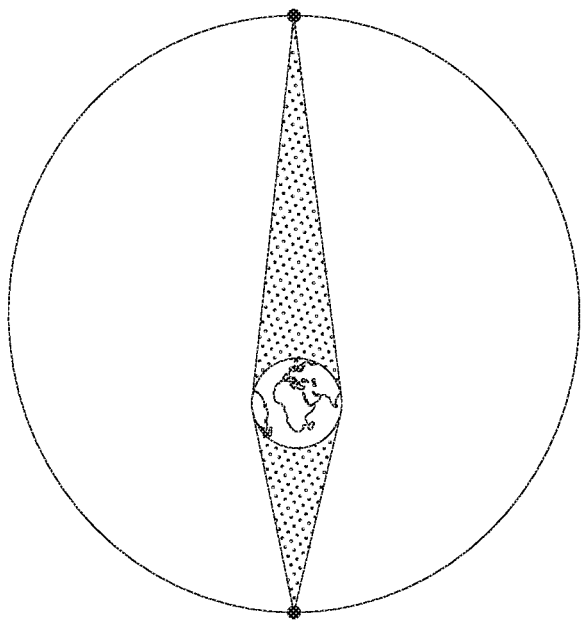
FIGS. 5A and 5B present, respectively, a graphic representation of a two-satellite constellation in co-planar orbits, in an embodiment of the invention, and a map showing the regions of continuous coverage it provides at a minimum elevation angle of 10°.
Figure 5B:
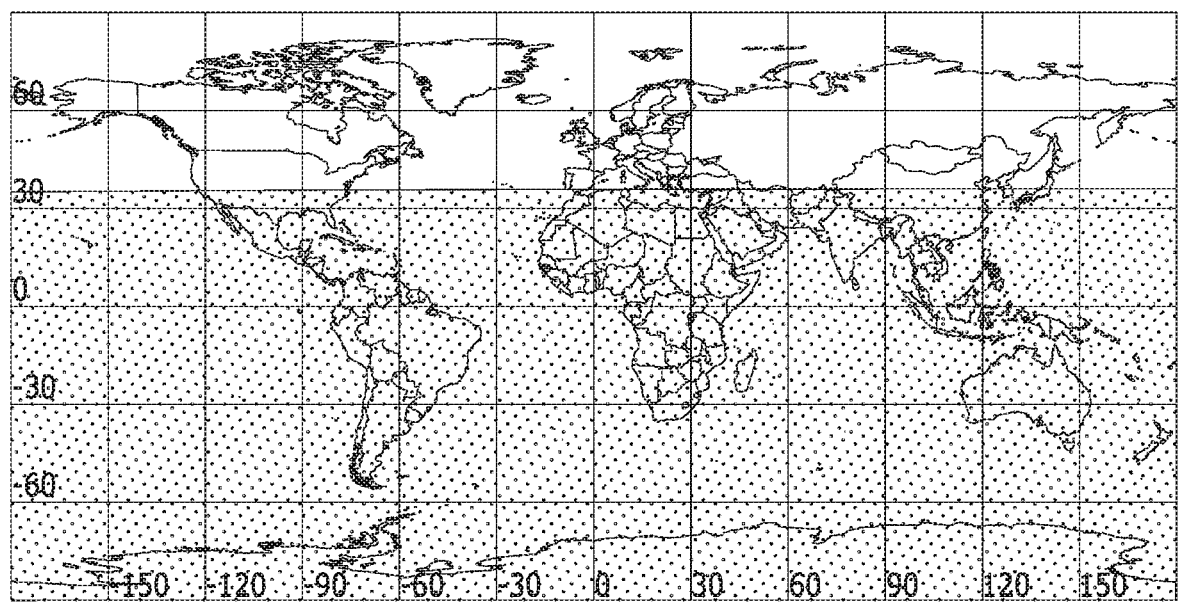

As shown in Embodiment 1, a constellation of two satellites in a single plane, with an orbital period of 24 hours (a sidereal day), an eccentricity of 0.30, inclination of 900 (i.e. apogee over the North pole), can provide continuous coverage north of 34°N, with an elevation angle of 10°. This represents only 21.5% coverage of the globe. A graphic representation of this constellation is presented in FIG. 5A, while FIG. 5B provides a simulation of the coverage that it would provide, the lighter areas being covered, while the darker areas are not. Of course, inverting the orbit so that the apogee is over the south pole would result in complete coverage south of 34°S, with a minimum elevation angle of 10°.

Figure 6A:
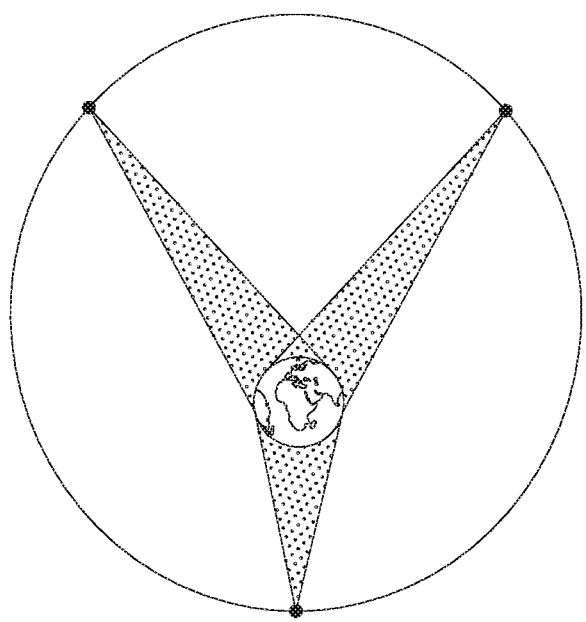
FIGS. 6A and 6B present, respectively, a graphic representation of a three-satellite constellation in co-planar orbits, in an embodiment of the invention, and the degree of global coverage it provides at minimum elevation angle of 10°.
Figure 6B:
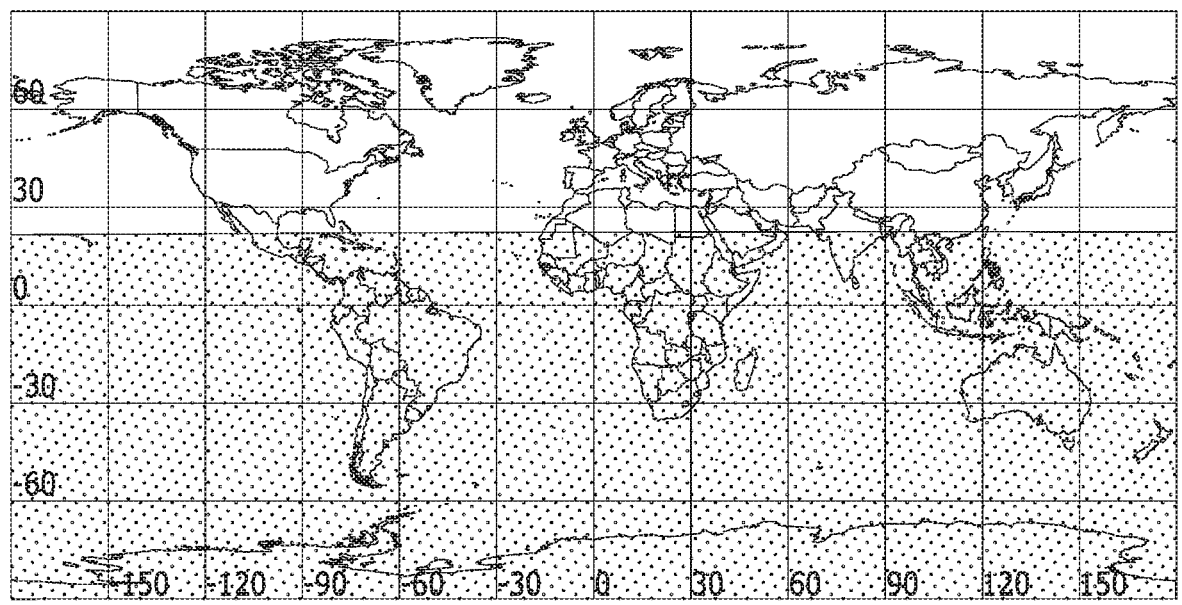

Embodiment 2 uses the same orbital parameters as Embodiment 1, except that a constellation of three satellites in a single plane is used, rather than two. The three satellites, of course, are arranged to be 8 hours apart. As a result, this embodiment provides continuous coverage north of 21°N, with an elevation angle of 10°. This represents only 32% coverage of the globe. A graphic representation of this constellation is presented in FIG. 6A, while FIG. 6B provides a simulation of the coverage that it would provide. Of course, inverting the orbit so that the apogee is over the south pole would result in complete coverage south of 21°S, with an elevation angle of 10°.

Figure 7A:
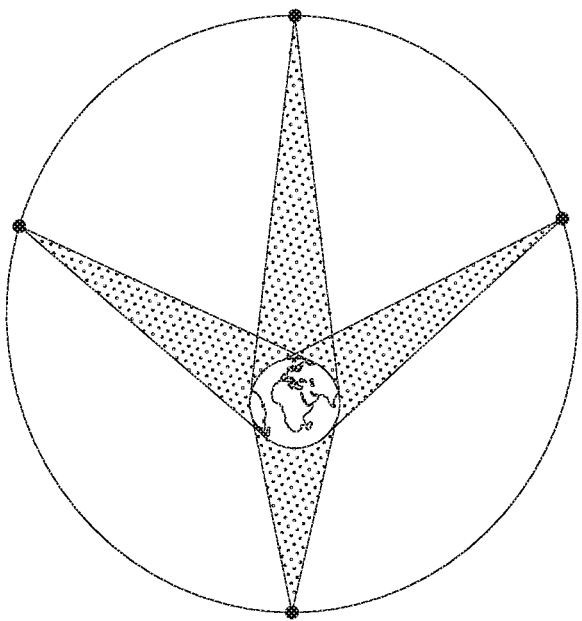
FIGS. 7A and 7B present, respectively, a graphic representation of a four-satellite constellation in co-planar orbits, in an embodiment of the invention, and the degree of global coverage it provides at minimum elevation angle of 10°.
Figure 7B:
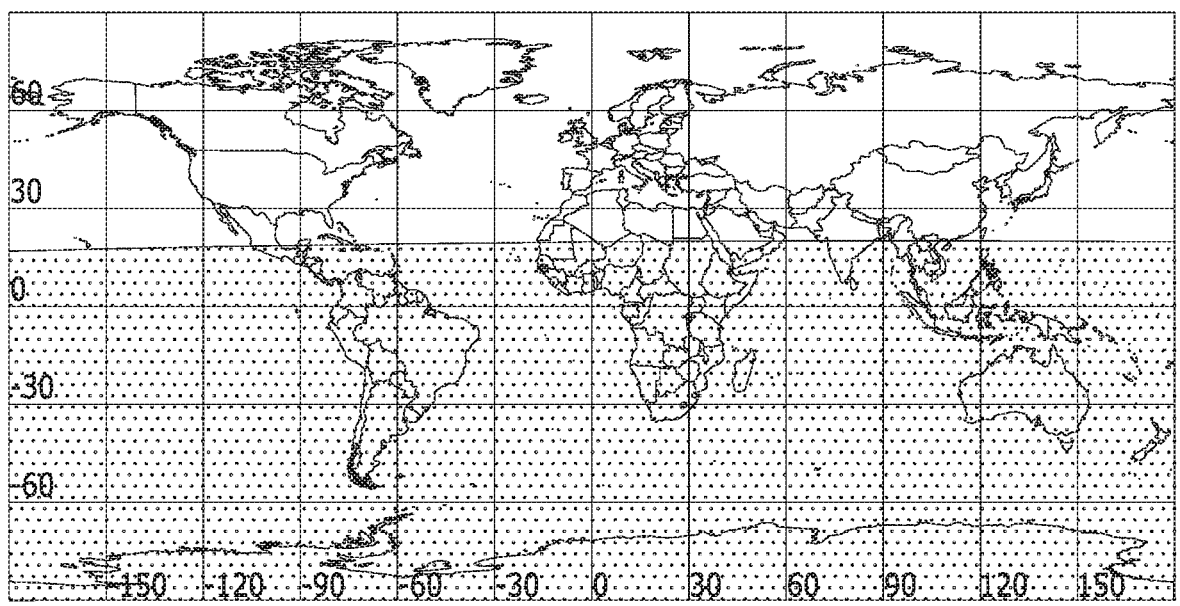

Embodiment 3 demonstrates the impact of adding a fourth satellite to the same, single plane as Embodiment 1 and 2, otherwise using the same orbital parameters. These four satellites are evenly spaced from one another, 6 hours apart. The result is only a modest improvement in coverage with respect to Embodiment 2, providing continuous coverage north of 18°N, with an elevation angle of 10°. This represents only 34% coverage of the globe. A graphic representation of this constellation is presented in FIG. 7A, while FIG. 7B provides a simulation of the coverage that it would provide. Of course, inverting the orbit so that the apogee is over the south pole would result in continuous coverage south of 18°S, with an elevation angle of 10°.

Figure 8A:
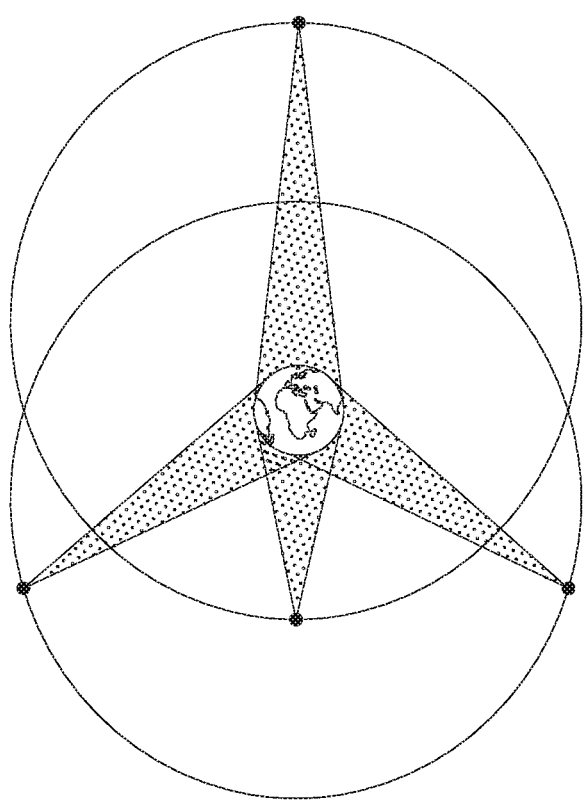
FIGS. 8A and 8B present, respectively, a graphic representation of a four-satellite constellation in co-planar orbits, two of the satellites having an apogee at the North Pole and two of the satellites having an apogee at the South Pole, in an embodiment of the invention, and the degree of global coverage it provides at minimum elevation angle of 10°.
Figure 8B:
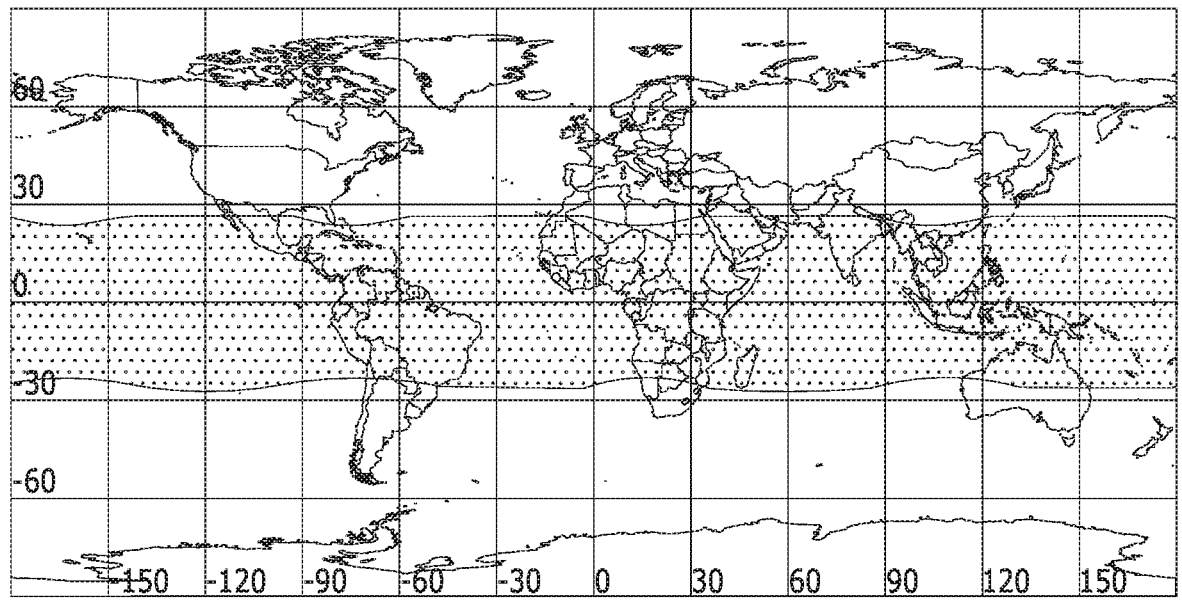

Embodiment 4 uses the same number of satellites as Embodiment 3, but instead of placing all four satellites in the same orbital path, two co-planar orbital paths are used, one with an apogee over the north pole, and the other with an apogee over the south pole. Two satellites are placed in each of these orbital paths, evenly spaced from one another, 12 hours apart. The result is a significant improvement in global coverage with regard to Embodiment 3, providing continuous coverage for 57% the globe, with an elevation angle of 10°. A graphic representation of this constellation is presented in FIG. 8A, while FIG. 8B provides a simulation of the global coverage that it would provide.

Figure 9A:
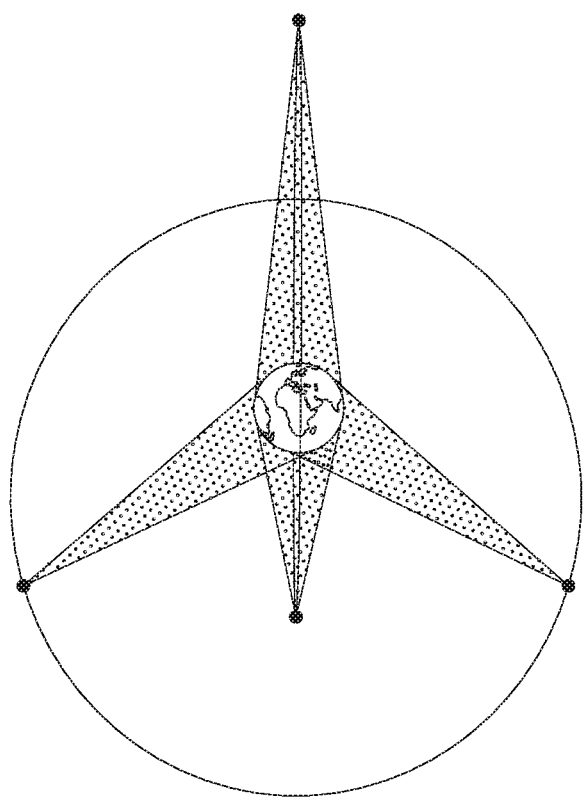
FIGS. 9A and 9B present, respectively, a graphic representation of a four-satellite constellation in orthogonal orbits, in an embodiment of the invention, and the degree of global coverage it provides at minimum elevation angle of 10°.
Figure 9B:
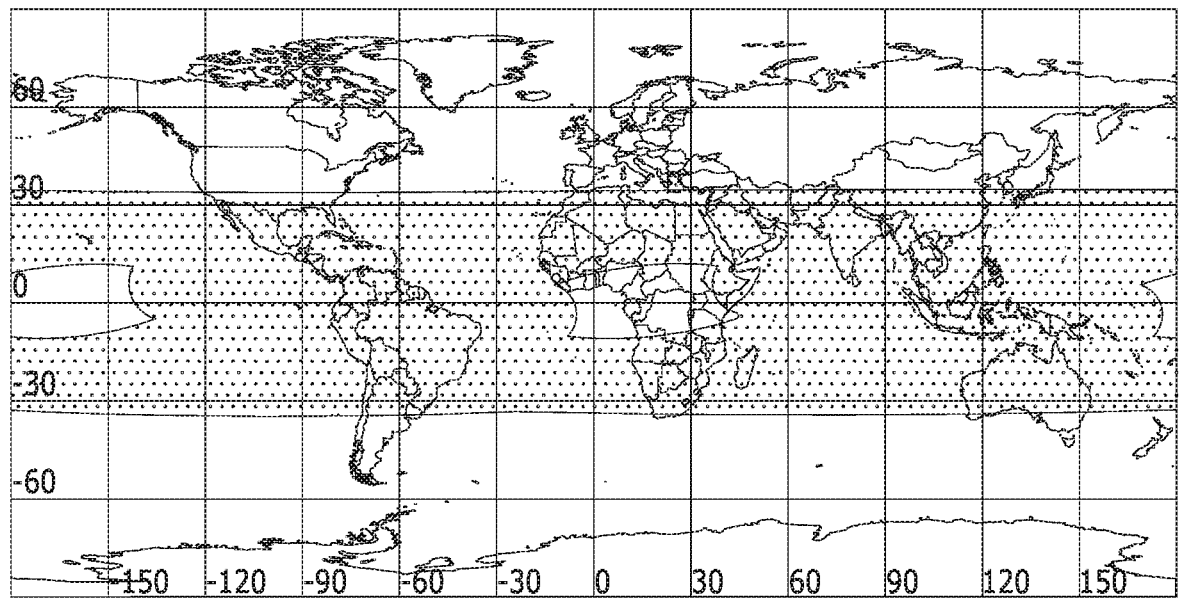

Embodiment 5 uses the same number of satellites and the same arrangement as Embodiment 4, except that the two orbital paths are not co-planar, but rather, have the same primary axis but are orthogonal to one another. The change from the co-planar orbital paths of Embodiment 4 to orthogonal paths of Embodiment 5 results in a decrease in continuous coverage from 57% of the globe to 48% of the globe, suggesting that the use of orthogonal orbital paths is not useful. A graphic representation of this constellation is presented in FIG. 9A, while FIG. 9B provides a simulation of the global coverage that this constellation would provide.

Figure 10A:
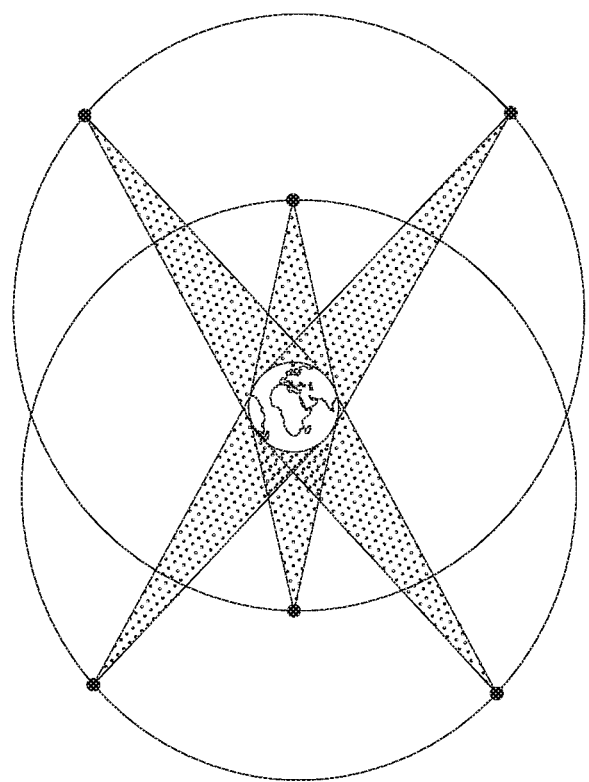
FIGS. 10A and 10B present, respectively, a graphic representation of a six-satellite constellation in co-planar orbits, in an embodiment of the invention, and the degree of global coverage it provides at minimum elevation angle of 10°.
Figure 10B:
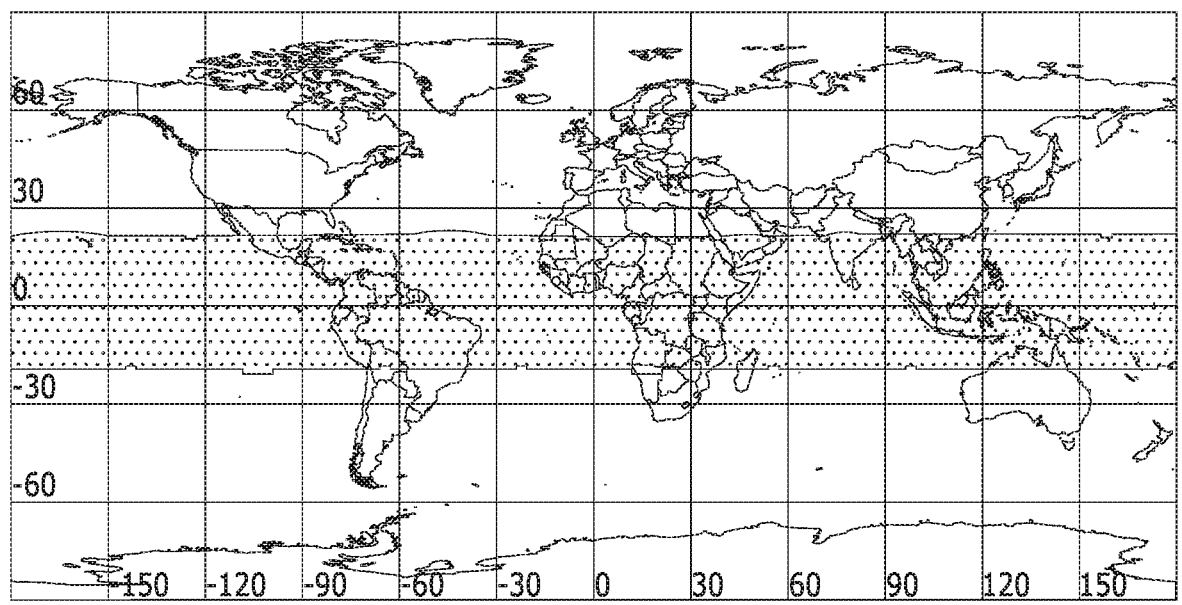

Embodiment 6 uses the same co-planar arrangement as Embodiment 4, the only difference being that the number of satellites in each orbital path is increased from two to three. The three satellites, of course, are arranged to be 8 hours apart. This change in the number of satellites results in an increase in continuous coverage from 57% of the globe Embodiment 4, to 64%. A graphic representation of this constellation is presented in FIG. 10A, while FIG. 10B provides a simulation of the continuous coverage that this constellation would provide.

Figure 11A:
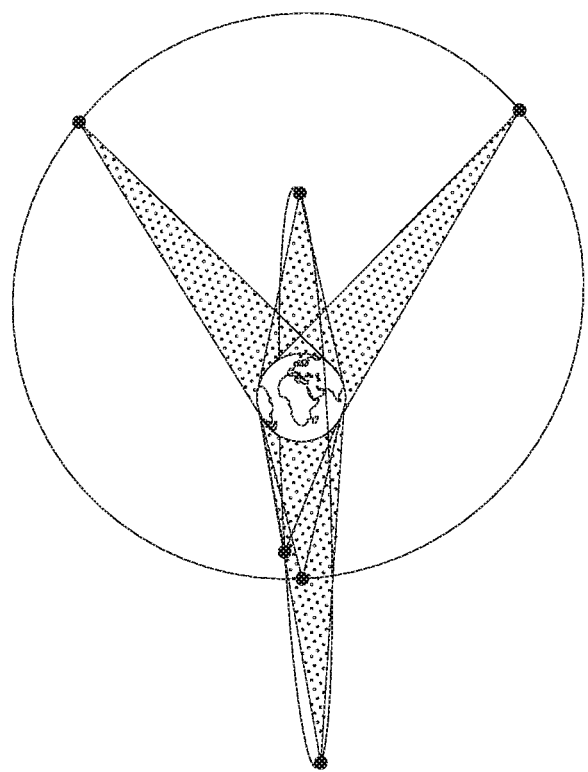
FIGS. 11A and 11B present, respectively, a graphic representation of a six-satellite constellation in orthogonal orbits, in an embodiment of the invention and the degree of global coverage it provides at minimum elevation angle of 10°.
Figure 11B:
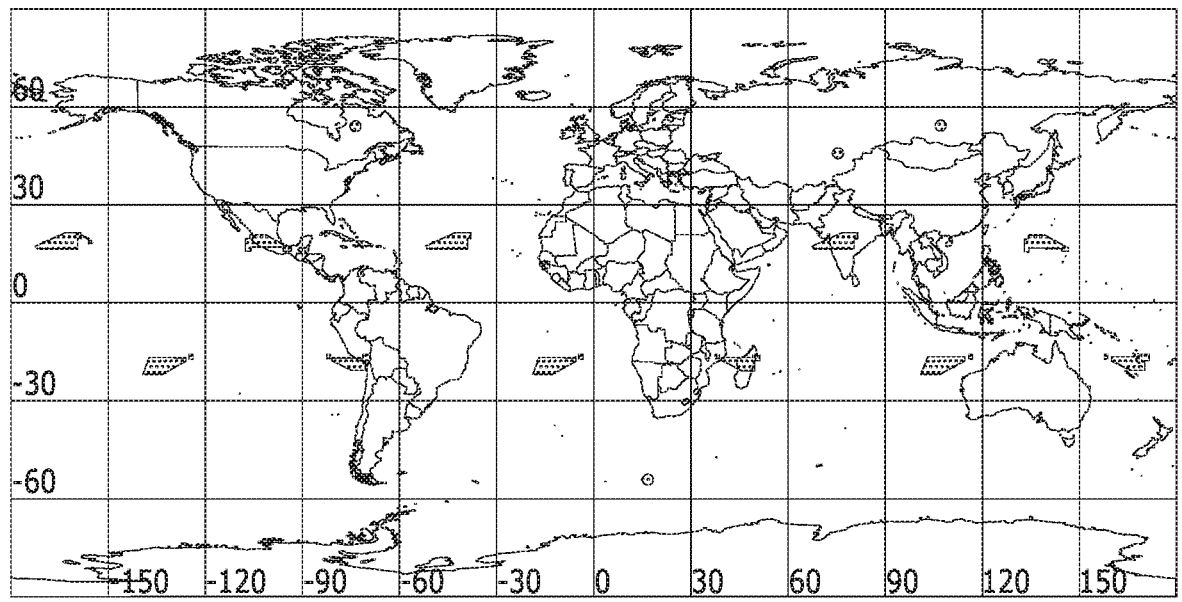

Embodiment 7 uses the same number of satellites and orbital parameters as Embodiment 6, the only difference being that in this case the two orbital paths are arranged to be orthogonal to one another. The surprising result is that the continuous coverage now increases from 64% of the globe in Embodiment 6, to 99% of the globe, with a minimum elevation angle of 10°. A graphic representation of this constellation is presented in FIG. 11A while FIG. 11B shows that continuous coverage may be provided at a minimum elevation angle of 10° almost over the entire globe. Continuous global coverage is achieved at a minimum elevation angle of 8.7°.

Figure 11C:
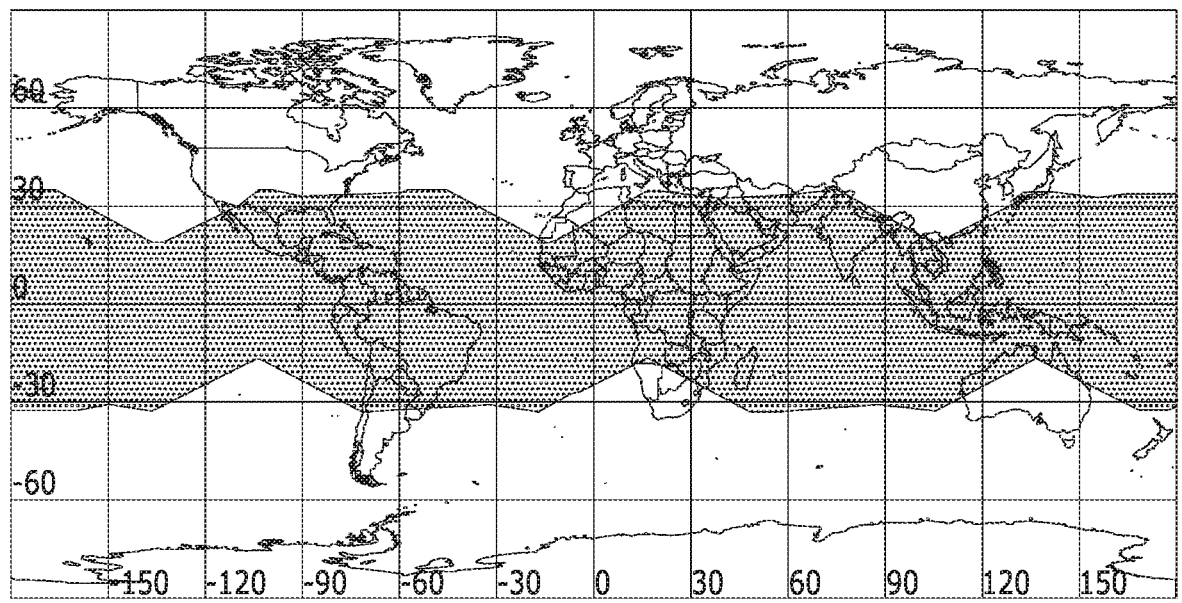
FIGS. 11C through 11F present graphic representations of the degree of global coverage such a constellation provides at a minimum elevation angle of 20°.
Figure 11D:
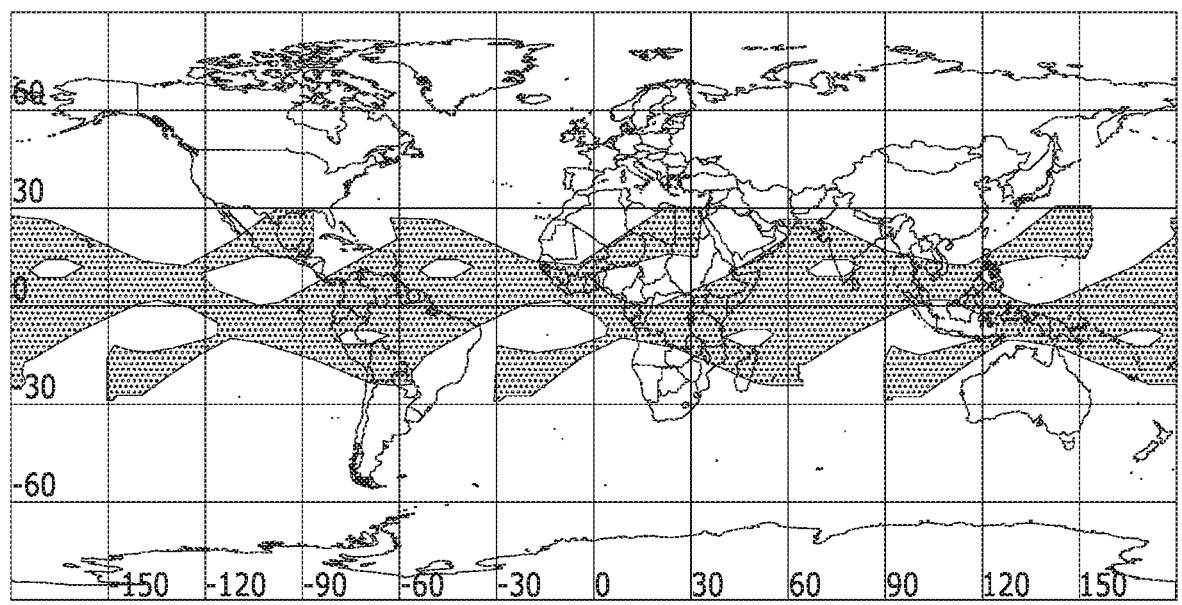
Figure 11E:
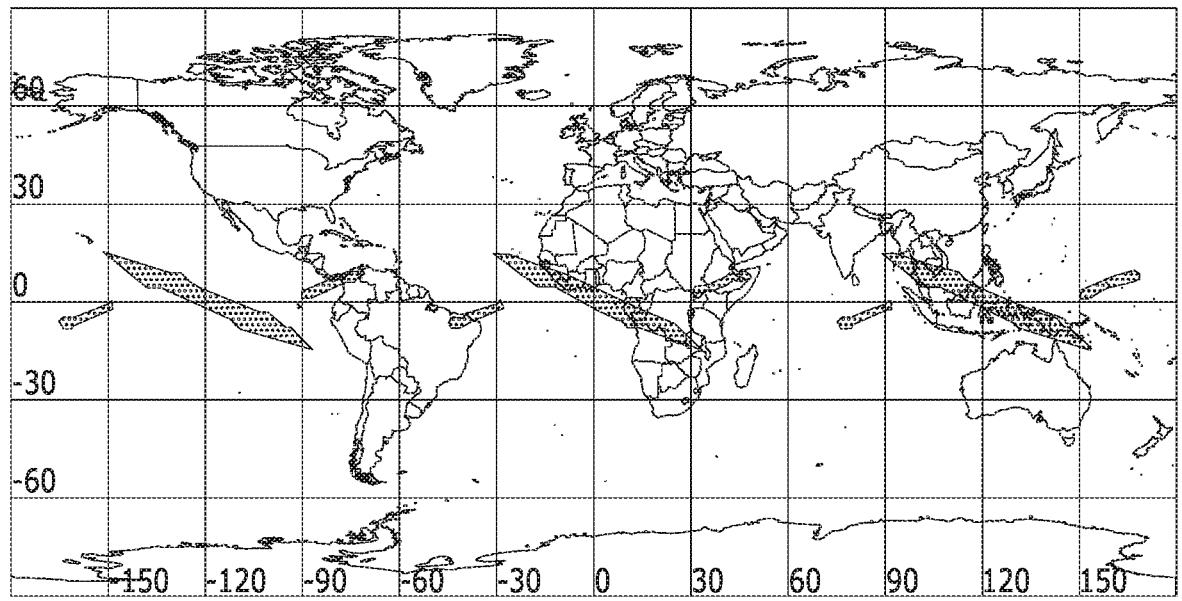
Figure 11F:
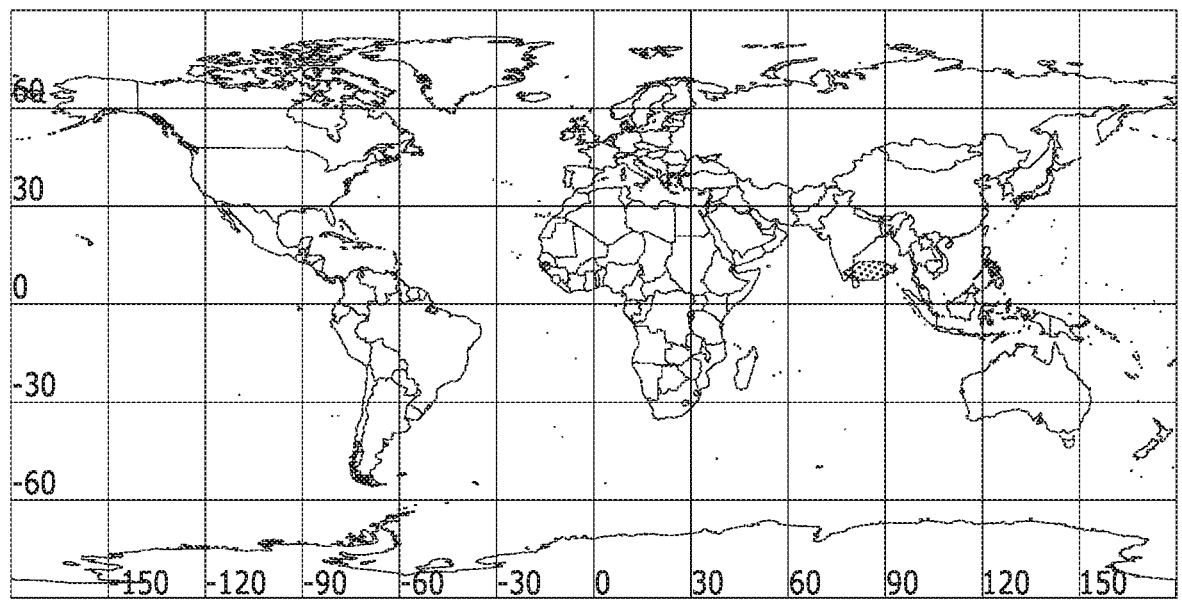

FIGS. 11C through 11F provide simulation results of the coverage that this constellation would provide, with a minimum elevation angle of 10°. Specifically:

FIG. 11C shows the coverage may be provided continuously at a minimum elevation angle of 20°, in the regions north of 34°N and south of 34°S;

FIG. 11D shows the coverage that may be provided at a minimum elevation angle of 20°, for 22.8 hours of the day;

FIG. 11E shows the coverage that may be provided at a minimum elevation angle of 20°, for 21.6 hours of the day; and FIG. 11F shows the coverage that may be provided at a minimum elevation angle of 20°, for 20.0 hours of the day.

Continuous, real time coverage is not required in many applications. In many cases, such as in meteorological imaging, 20.0 hours per day coverage (at a minimum elevation angle of 20°) may be sufficient.

As shown in FIG. 1, while an inclination of 90° has been found to be advantageous, this parameter can be relaxed to an inclination range approximately from 70° to 90°. Even with the relaxation of this parameter, this application still provides the following advantages:

coverage of almost global/circumpolar regions is possible but the apogee must increase with decreasing inclination; e.g., an increase in apogee from 48,100 km to 50,100 km results from a decrease in inclination from 90° to 80°. Although 2,000 km is a small percentage difference, it is significant enough to make the 90° orbit preferable. The closer altitude will result in better communication, more accurate scientific data and better resolution from Earth observation equipment; and satellites not inclined 90° can operate in different orbital planes making possible a single ground track.

Table 2 below, shows the minimum eccentricity (i.e. minimum apogee height) required to meet the circumpolar coverage requirement indicated for a range of lower orbital plane inclinations.

For this table, the circumpolar coverage requirement is defined as 100% of coverage for 100% of the time of the circumpolar region above 60° north (or below 60° south for the south circumpolar region) at a minimum elevation angle of 20° (equivalent to a maximum angle of incidence of 70°).

TABLE 2

ANALYSIS OF HIGH INCLINATIONS

| Inclination | Eccentricity | Apogee Height |
|---|---|---|
| 90° | 0.30 | 48435.2 km |
| 87° | 0.31 | 48856.8 km |
| 84° | 0.33 | 49700.1 km |
| 81° | 0.34 | 50121.8 km |
| 78° | 0.36 | 50965 km |
| 75° | 0.40 | 52651.6 km |
| 72° | 0.42 | 53494.9 km |
| 69° | 0.46 | 55181.4 km |

Lowering the inclination increases the required eccentricity. However, this results in an apogee height which will increase the path loss for a communications payload and reduce the resolution achieved by an Earth observation payload. Hence, for such applications, the range of approximately 80° to 90° inclination is preferred.

Increasing the eccentricity above a minimum required for a given inclination will increase the area which can be continuously covered, in this case to below the 60° latitude contour.

Figure 12:
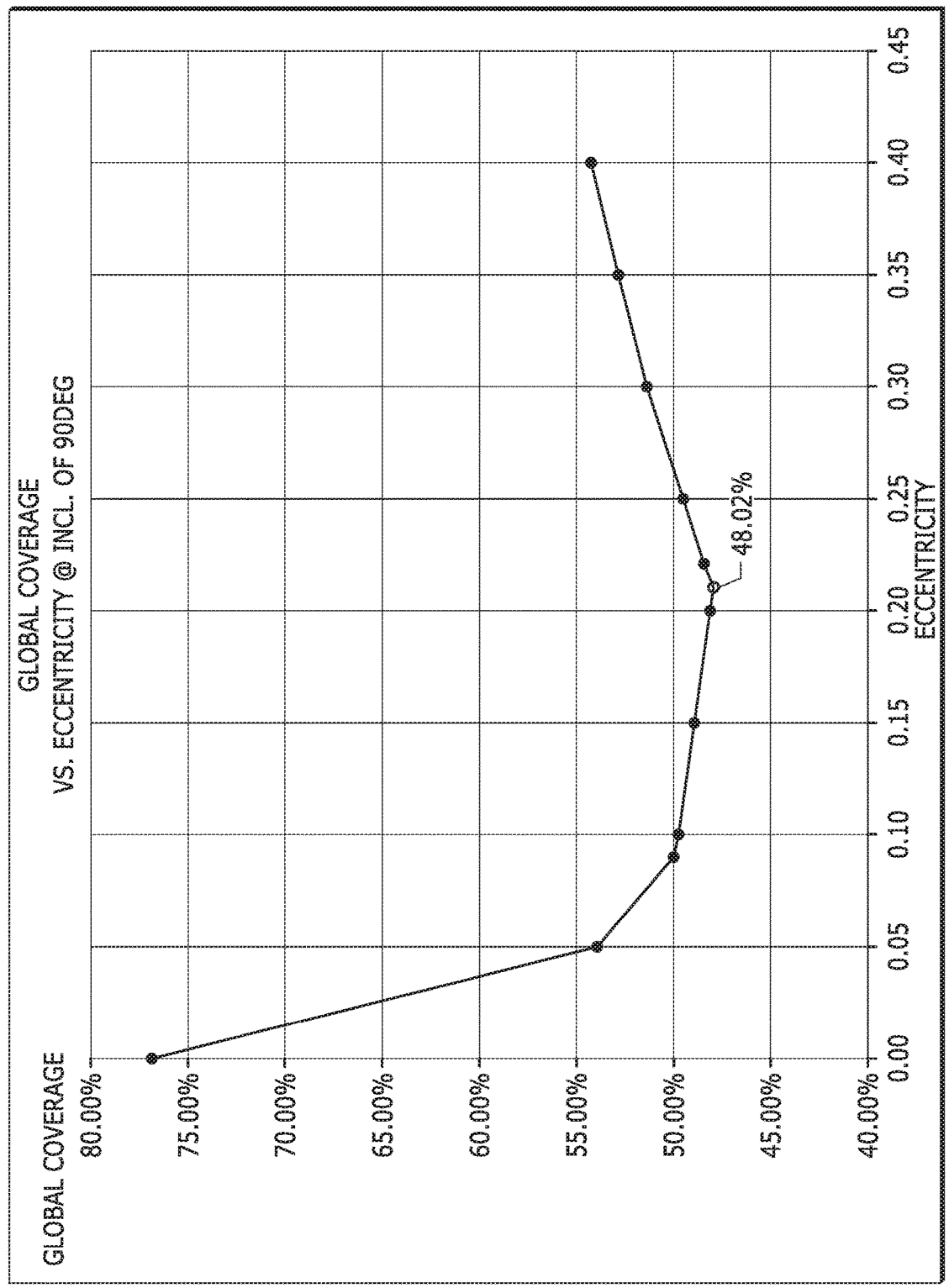
FIG. 12 presents a graph which shows how the variation of the eccentricity affects coverage, at a minimum elevation angle of 20° for a fixed inclination of 90°.

By lowering the eccentricity (making the orbit more circular) the minimum elevation angle can be improved to 12.3°. The percentage of the globe covered continuously at a minimum elevation angle of 20° increases to 76% when eccentricity approaches 0.0 (see FIG. 12, where the x-axis is the eccentricity and the y-axis is the percentage of global coverage). However, to avoid having the satellite orbit fall within the GEO belt, the eccentricity must be kept above 0.09. At this point the percentage coverage is actually worse than the coverage achieved at the optimal eccentricity of the invention, of 0.30.

Figure 13A:
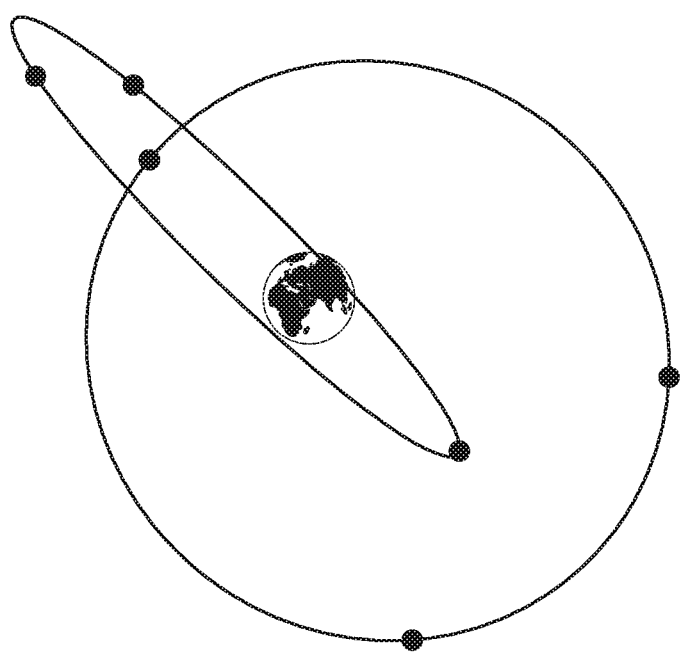
FIG. 13A presents a graphic representation of the inclination of one plane being decreased, while at the same time decreasing the argument of the perigee of the other plane by the same amount, the constellation tilting towards the equator.
Figure 13B:
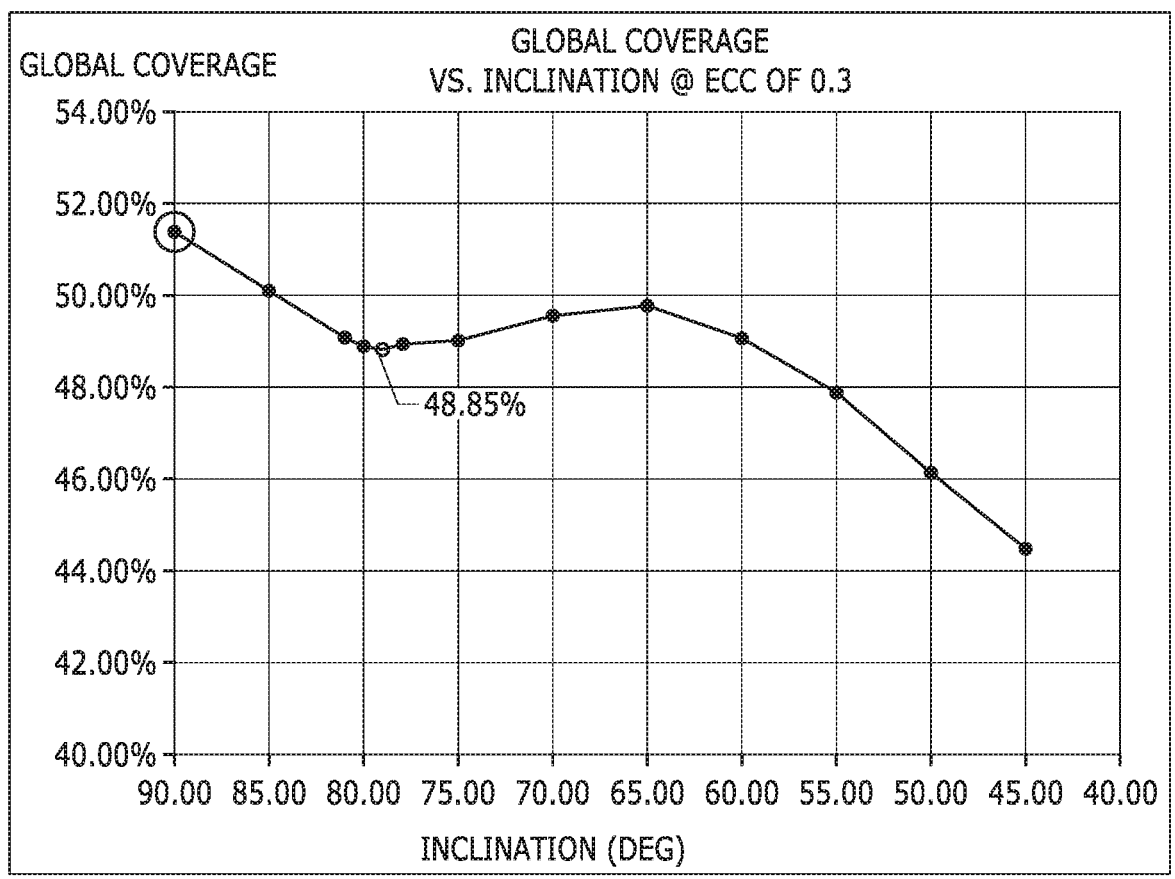
FIG. 13B presents a graph showing how such a variation impacts the degree of coverage, at a minimum elevation angle of 20°, the eccentricity being fixed at 0.3.

By decreasing the inclination of one plane and at the same time decreasing the argument of the perigee of the other plane by the same amount, the constellation tilts towards the equator (see the graphic representation of such an arrangement in FIG. 13A). As shown in the graph of FIG. 13B, the percent coverage at 20° elevation worsens and is best with the optimal inclination of the invention, of 90°. It was expected that the rotation of the Earth would affect the data, but the extent of the effect as shown in FIG. 13B was clearly not intuitive. It is believed that the unexpected results were due to nonlinearities in the system.

Graceful Degradation

One significant advantage of the satellite constellations of the invention is that they provide for graceful degradation in the event of the failure of a satellite. In contrast, the failure of one satellite in the constellations such as those proposed in U.S. Pat. No. 4,809,935, would have a dramatic effect on the coverage.

Figure 14:
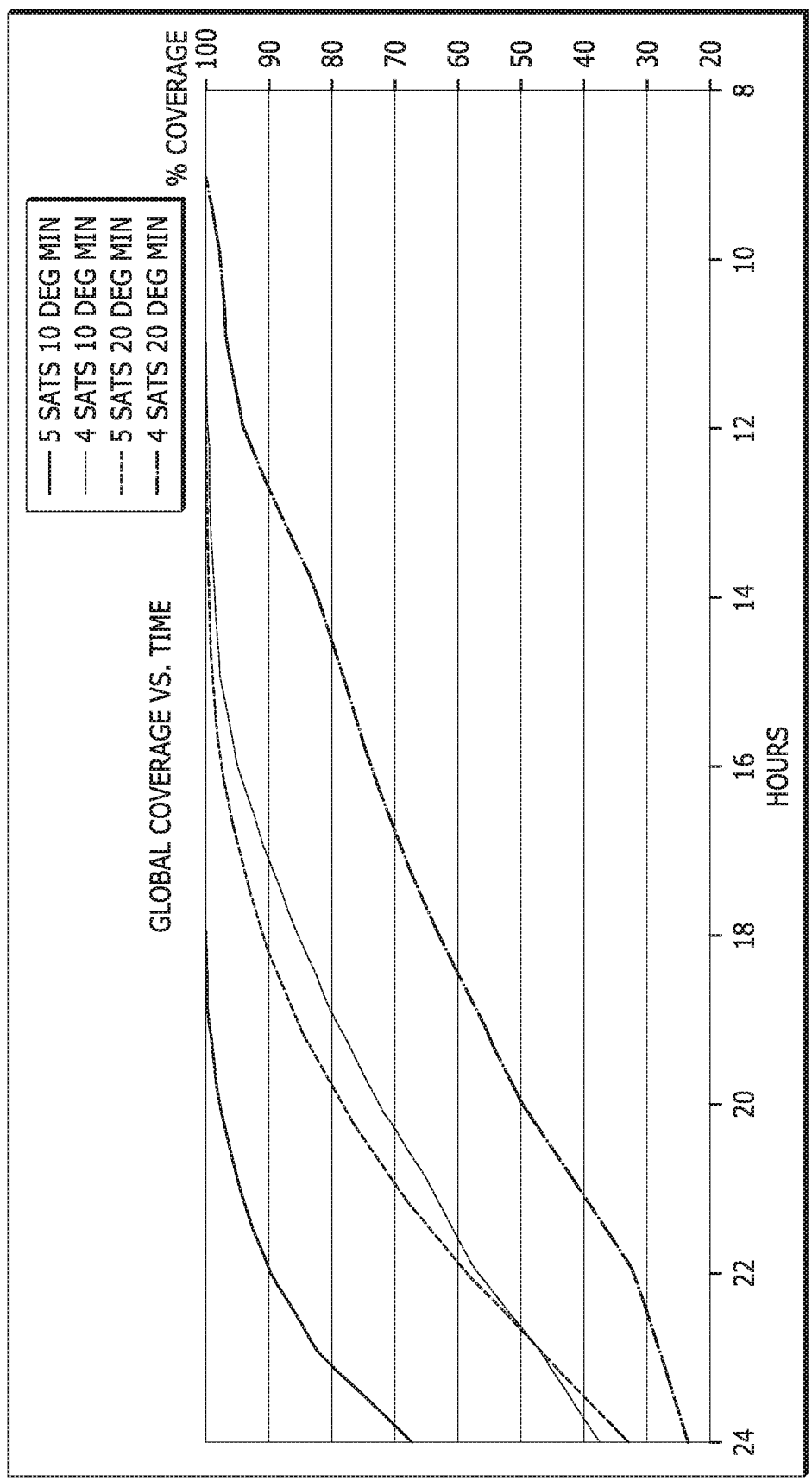
FIG. 14 presents a graph showing the degree of global coverage vs. time for four different degraded conditions from an optimal six-satellite constellation: five satellites at 10° and 20° elevation angles, and four satellites at 10° and 20° elevation angles.

FIG. 14 presents a graph showing the degree of global coverage vs. time for four different degraded conditions from an optimal six-satellite constellation: five satellites at 10° and 200 elevation angles, and four satellites at 10° and 20° elevation angles. As shown, a five satellite constellation will still provide 100% coverage for more than 19 hours per day, at an elevation angle of 10°. As another example, if the system was to further degrade to a four satellite constellation, 90% coverage can still be provided at a 10° elevation angle for approximately 17 hours per day.

Figure 15A:
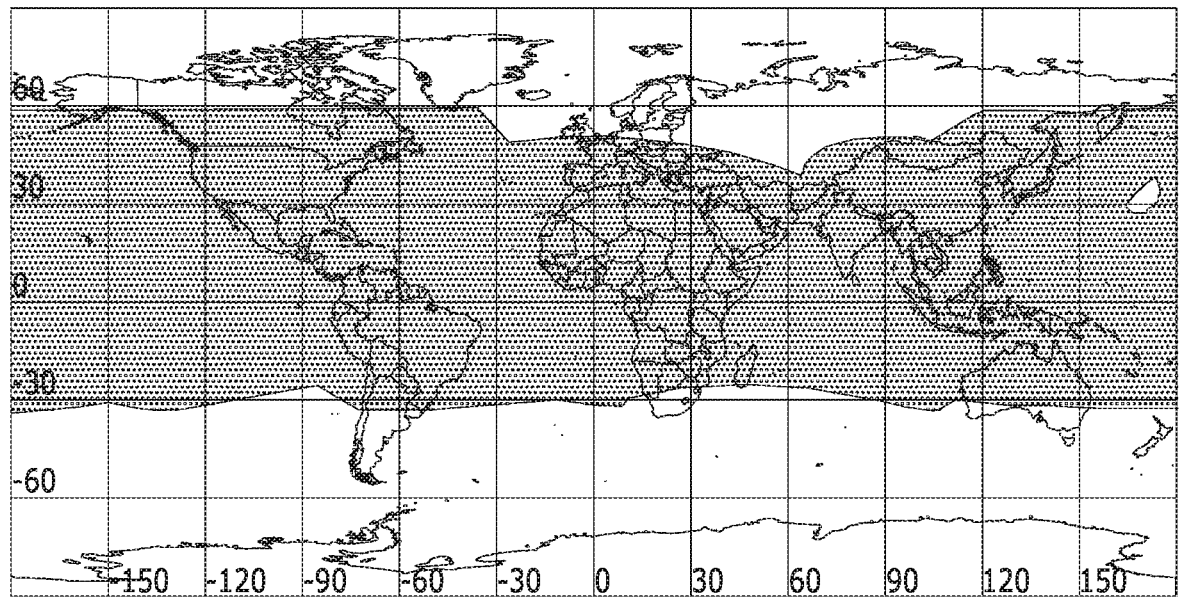
FIGS. 15A through 15F present simulation data for the coverage, at a minimum elevation angle of 20°, provided by an optimal six-satellite constellation degraded to five satellites.
Figure 15B:
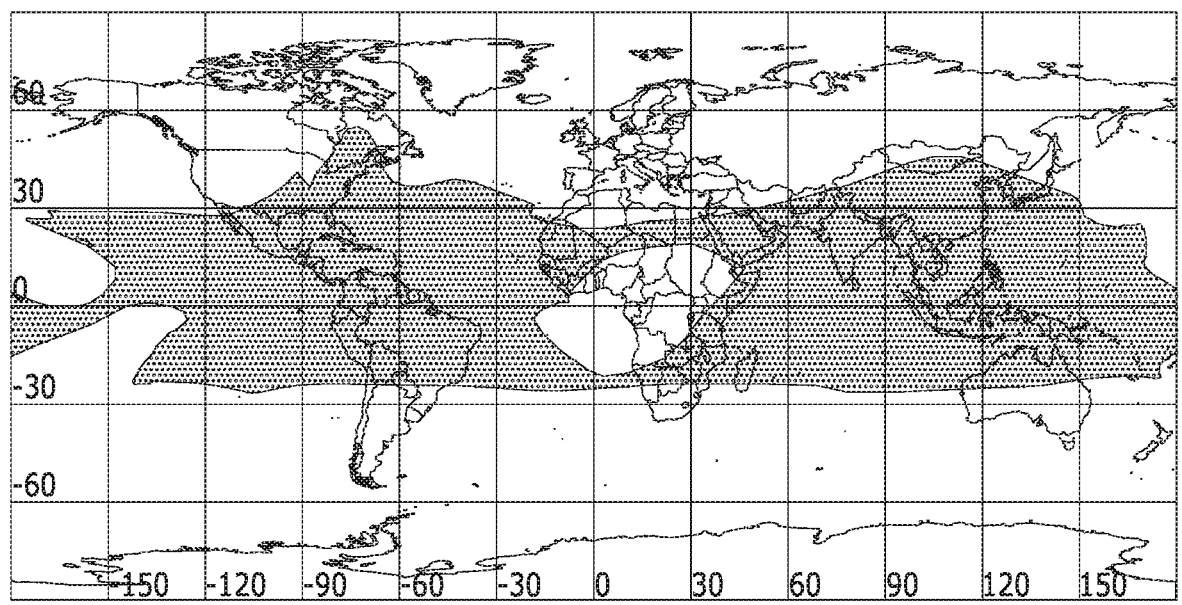
Figure 15C:
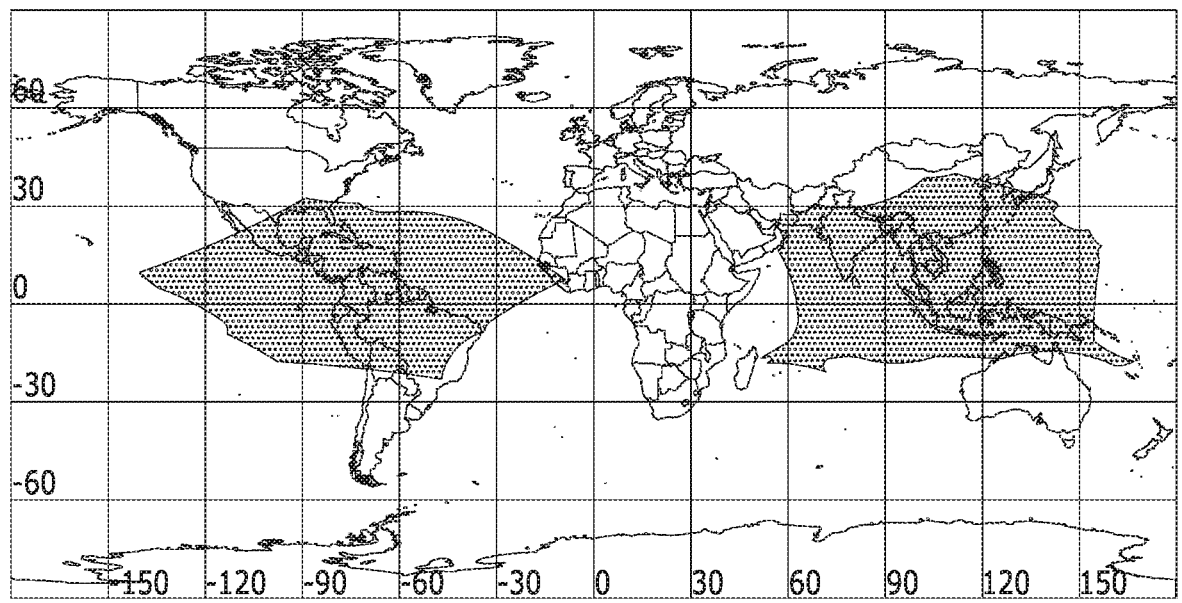
Figure 15D:
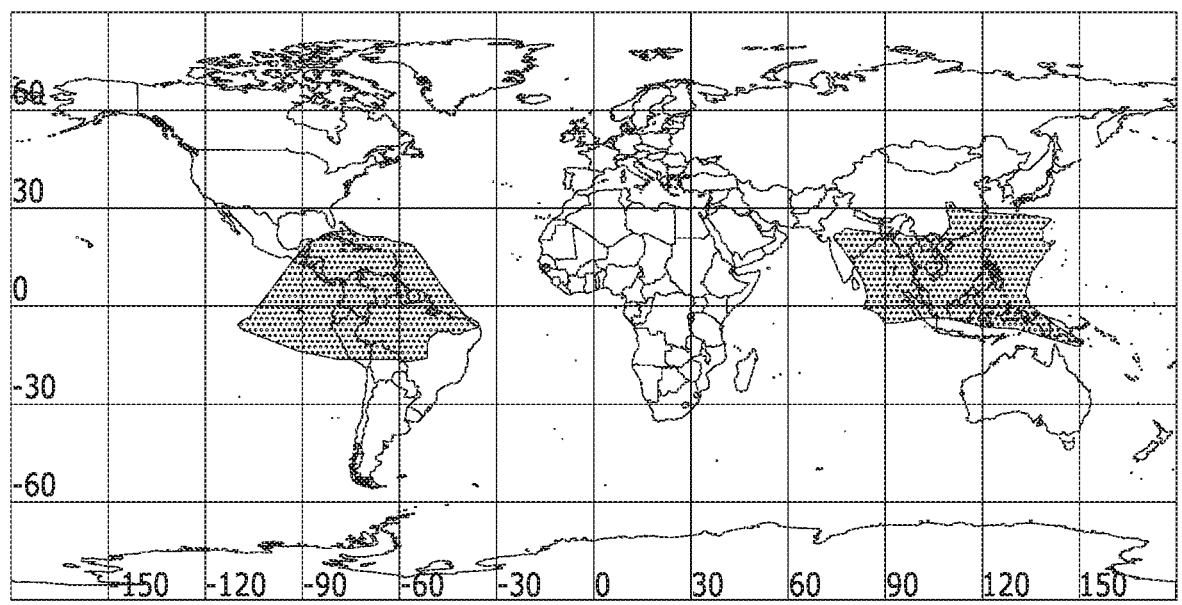
Figure 15E:
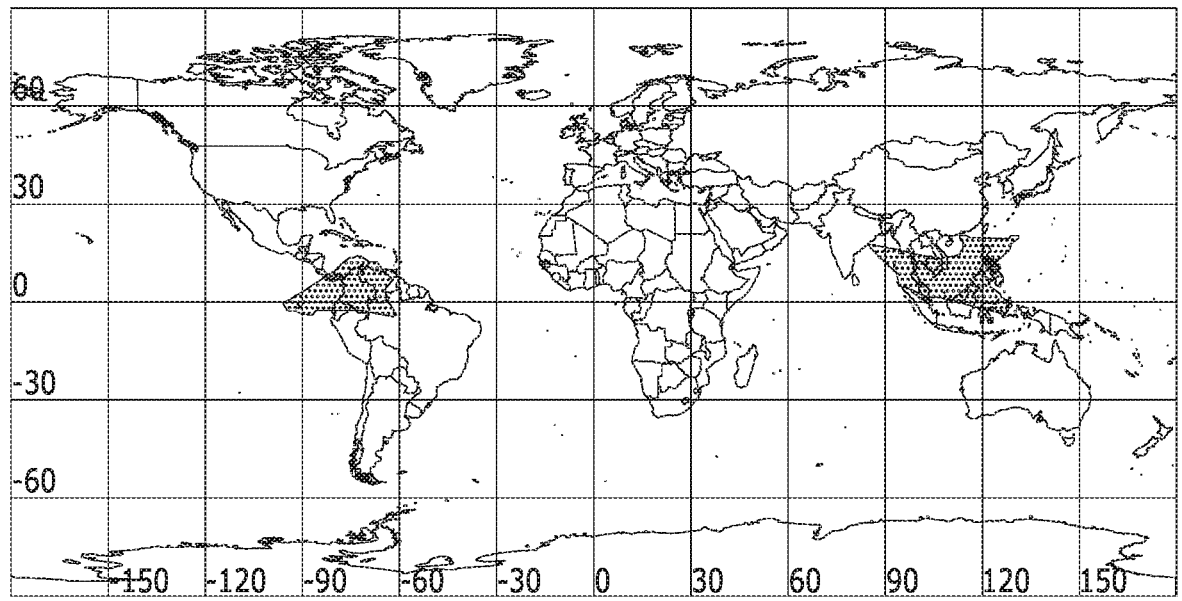

FIGS. 15A through 15F present simulation data for the coverage provided by an optimal six-satellite constellation degraded to five satellites (two orthogonal, opposite apogee orbits, an eccentricity of 0.3, an inclination of 90°, a minimum elevation angle of 20°, two of the satellites being in an arctic orbit 12 hours apart, three of the satellites being in an Antarctic orbit 8 hours apart). The dark areas in FIGS. 15A through 15F show areas which are not covered while the light areas are covered. Specifically:

FIG. 15A shows 100% time coverage over 33.66% global area;

FIG. 15B shows 91.67% time coverage over 59.51% global area;

FIG. 15C shows 83.34% time coverage over 79.00% global area;

FIG. 15D shows 75.00% time coverage over 91.51% global area;

FIG. 15E shows 66.67% time coverage over 97.87% global area; and

Figure 15F:
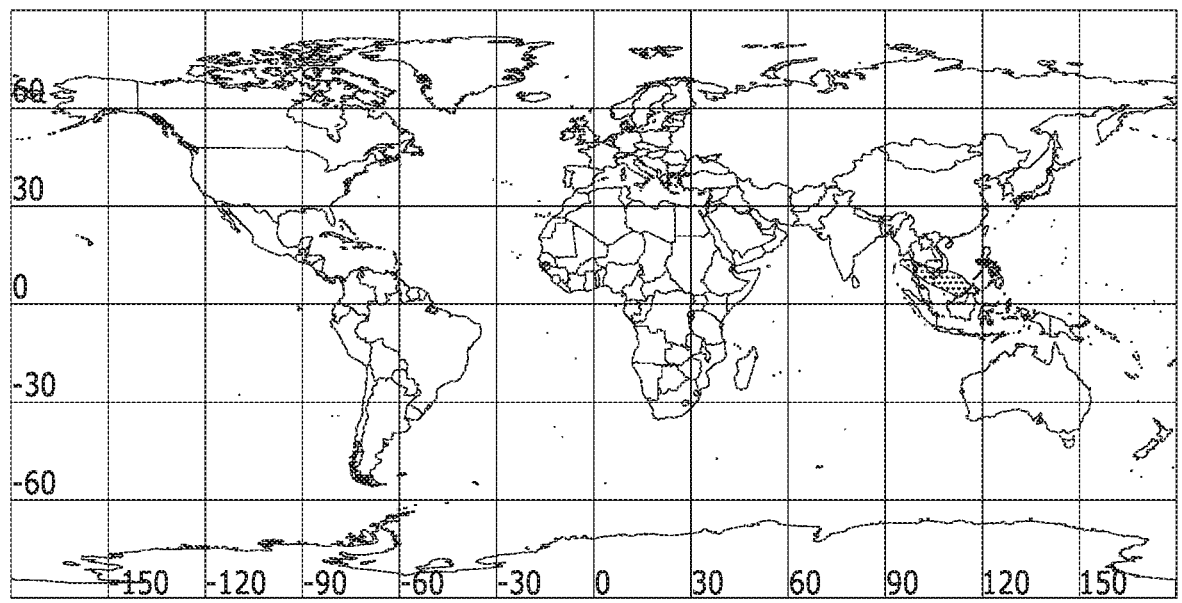

FIG. 15F shows 58.34% time coverage over 99.76% global area.

Figure 16A:
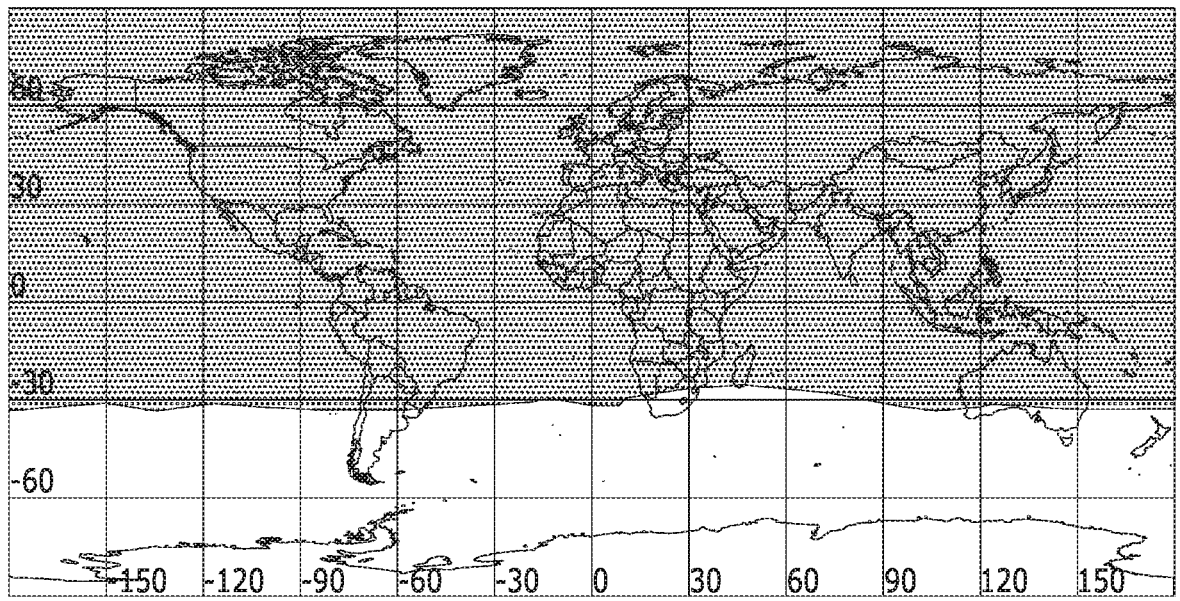
FIGS. 16A through 16H present simulation data for the coverage, at a minimum elevation angle of 20°, provided by an optimal six-satellite constellation degraded to four satellites.
Figure 16B:
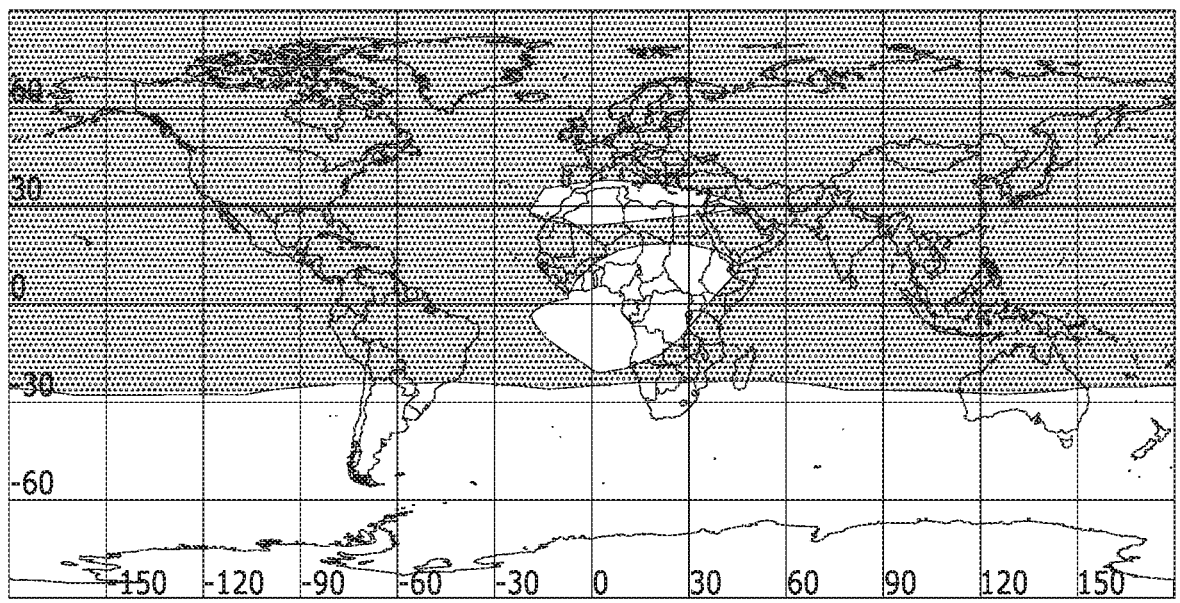
Figure 16C:
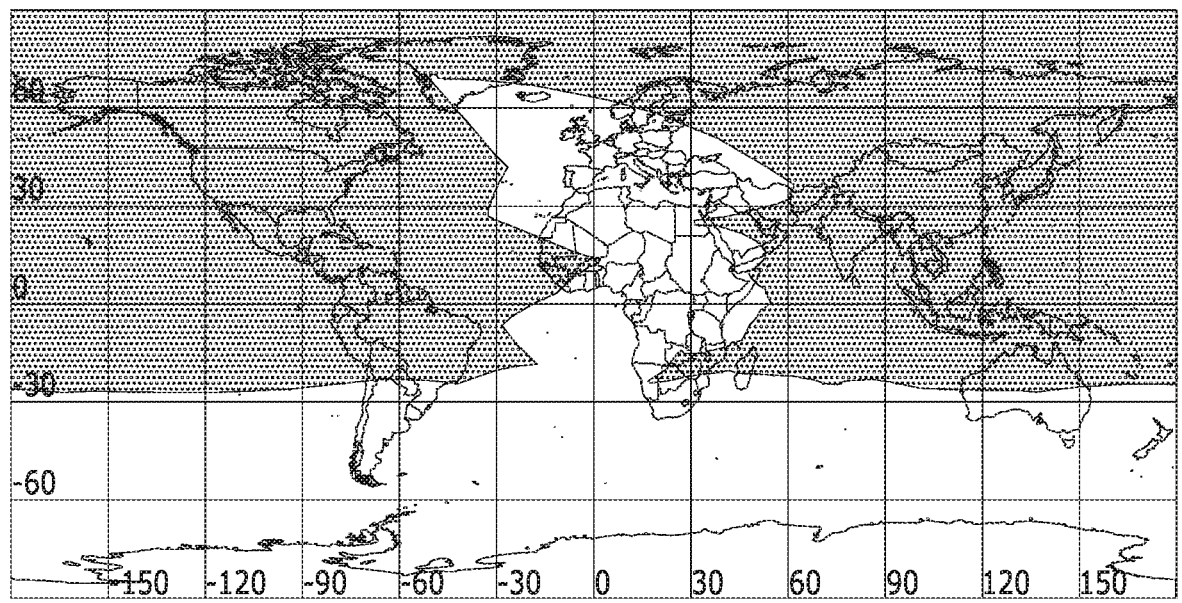
Figure 16D:
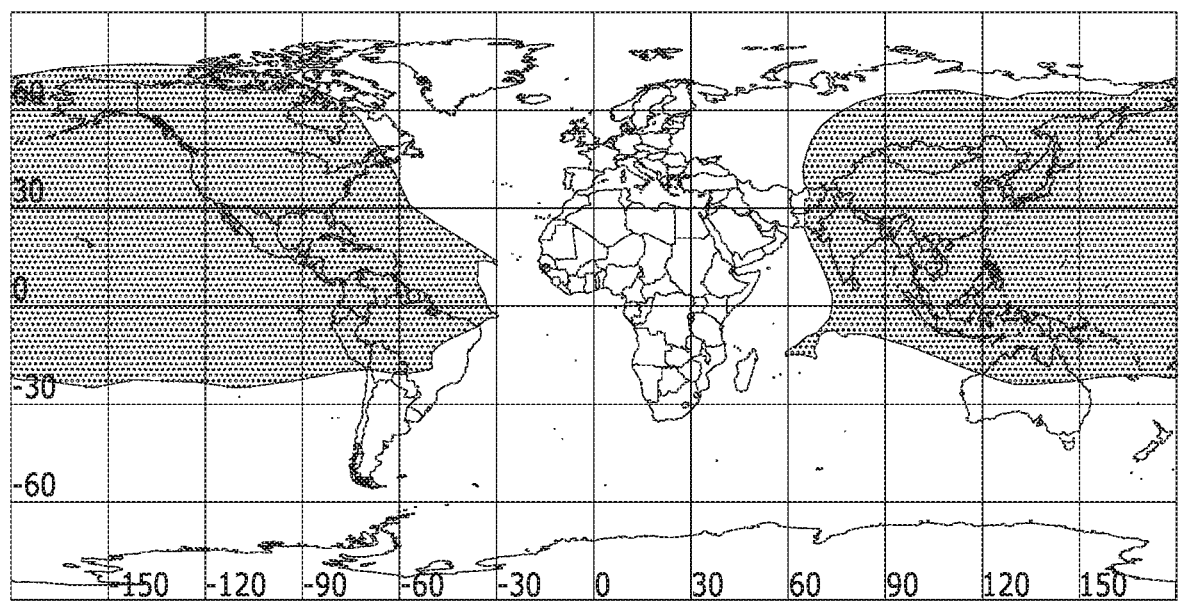
Figure 16E:
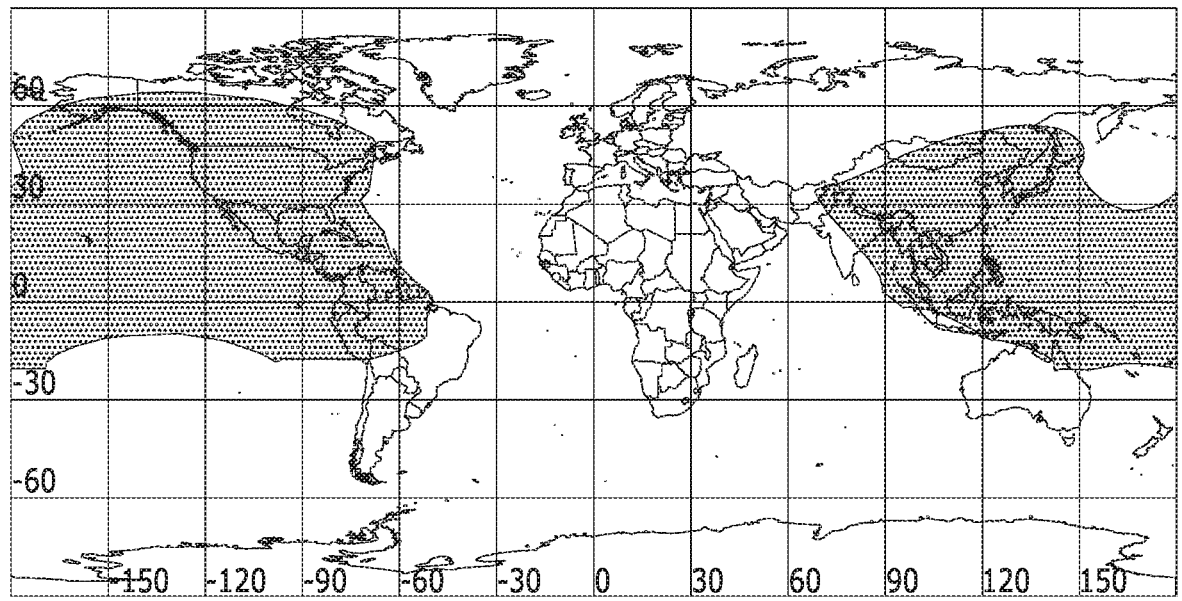
Figure 16F:
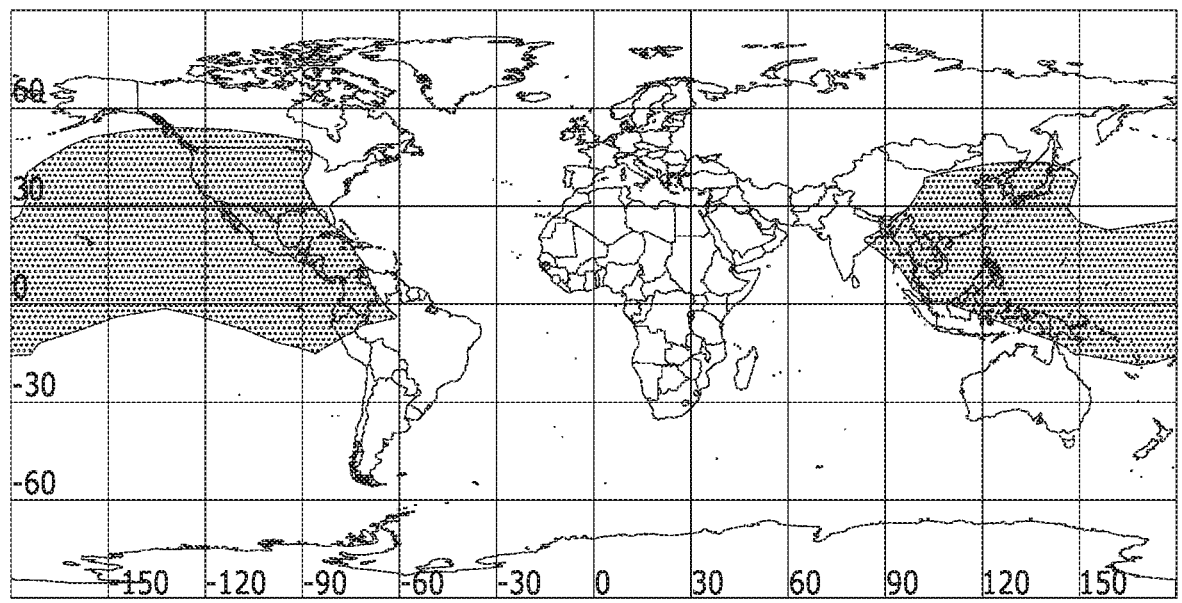
Figure 16G:
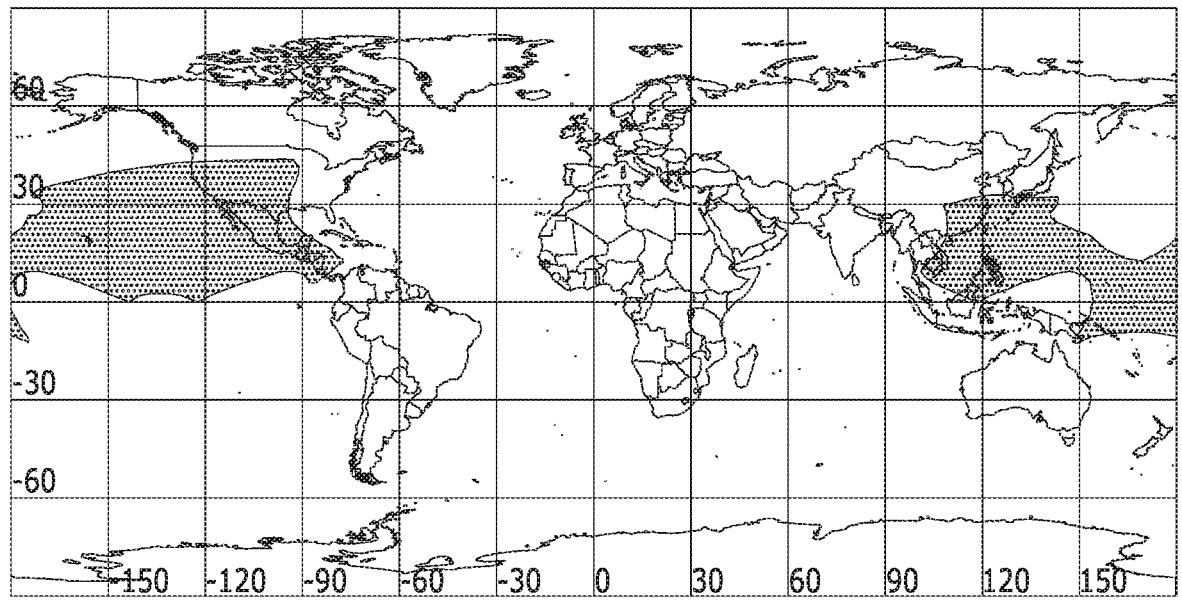

Similarly, FIGS. 16A through 16F present simulation data for the coverage provided by an optimal six-satellite constellation degraded to four satellites (two orthogonal, opposite apogee orbits, an eccentricity of 0.3, an inclination of 90°, a minimum elevation angle of 20°, one satellite being in an arctic orbit, and three of the satellites being in an Antarctic orbit 8 hours apart). The dark areas in FIGS. 16A through 16H show areas which are not covered while the light areas are covered. Specifically:

FIG. 16A shows 100% time coverage over 23.67% global area;

FIG. 16B shows 91.67% time coverage over 32.57% global area;

FIG. 16C shows 83.34% time coverage over 50.25% global area;

FIG. 16D shows 75.00% time coverage over 63.36% global area;

FIG. 16E shows 66.67% time coverage over 73.97% global area;

FIG. 16F shows 58.34% time coverage over 82.46% global area;

FIG. 16G shows 50.00% time coverage over 94.29% global area; and

Figure 16H:
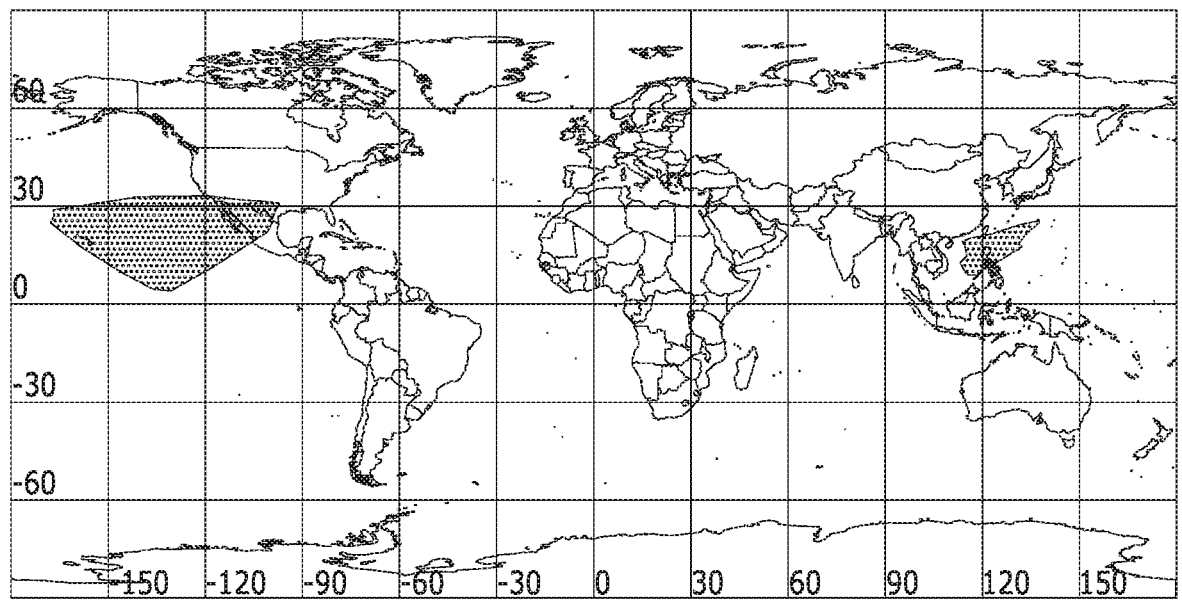

FIG. 16H shows 41.67% time coverage over 97.85% global area.

Thus, the satellite constellations of the invention are resilient and can accommodate the loss of a satellite with much less disruption than known in the art. In addition, it is also clear from the above that:

one can accommodate for the loss of a satellite largely by use of an existing GEO satellite, as the primary areas affected by the satellite loss, is around the equator. See for example, FIGS. 15B and 16E;

as well, it can be observed that the system of the invention provides many options for staged growth, as constellation systems with fewer than six satellites still have very significant utility. One could, for example, implement a two-satellite polar constellation using the parameters of the invention, and then add satellites over time to incrementally expand service, eventually providing global coverage.

Orbit Control

Satellite constellations of this invention will experience changes in the aforementioned orbital parameters over time due to the Earth's oblateness, gravitational forces of the sun and moon, and solar radiation pressure. These can be compensated by performing periodic orbit-correction manoeuvres using the satellite's on-board propulsion system. The primary parameter of concern is the Argument of Perigee.

For orbit inclinations greater than 63.4°, the argument of perigee will tend to change (decrease) at a fairly constant rate, due (primarily) to the Earth's oblateness. As the inclination increases from 63.4° to 90°, the rate of change of argument of perigee ($\omega$) increases. To maintain service to the northern polar cap, the orbit apogee must be kept close to the most northerly point of the ground track (corresponding to $\omega=2700$); hence orbit maintenance manoeuvres will be performed to control the argument of perigee. These manoeuvres will be similar to the double-burn east-west manoeuvres that are performed to control the eccentricity of a geostationary satellite, but will be considerably larger.

The rate at which the argument of perigee changes is a complex function of the orbit inclination, eccentricity, semi-major axis and right ascension of ascending node (RAAN). Note that the classic Molniya orbit with an inclination of 63.4° is not exempt from argument of perigee changes due to the gravitational effects of the sun and moon; the Molniya argument of perigee may decrease by as much as 2°/year, depending on the RAAN. For the orbit of the invention the magnitude of the argument of perigee rate is larger. At an inclination of 63.4° the rate may exceed 6°/year, and at an inclination of 90° the rate is 8.3°/year.

A single correction to the argument of perigee may be applied by performing two "delta-v" manoeuvres at opposite sides of the orbit roughly midway between the apogee and perigee ("delta-v" is merely an aerospace term for a change in velocity). With the manoeuvre that is performed as the satellite moves southward toward perigee, thrusters will be fired to provide a retrograde delta-v to reduce the orbit velocity, causing the argument of perigee to increase. With the manoeuvre that is performed as the satellite moves northward toward apogee, thrusters will be fired to provide a prograde delta-v to increase the orbit velocity, which will also increase the argument of perigee. The two manoeuvres will be performed one half-orbit apart; the order in which the manoeuvres are performed will not matter. The velocity changes of the two manoeuvres will be roughly equal to avoid unwanted changes to the orbit period.

The size of each argument of perigee correction will be determined by the thrust and duration of the two manoeuvres. Because longer manoeuvres are less efficient, it will be preferable to perform frequent, short-duration manoeuvres rather than less-frequent, long-duration manoeuvres. For satellites equipped with chemical (bi-propellant) propulsion systems, the achievable thrust will be large enough to allow several days or even weeks between manoeuvre pairs. For satellites utilizing high-efficiency, low-thrust ion thrusters, manoeuvres may be performed during every orbit revolution.

Over time, if left uncontrolled the other orbit parameters will begin to wander away from their nominal values due to the perturbing forces of Earth oblateness and lunar/solar gravity. The two remaining "in-plane" classic orbital elements, semi-major axis and eccentricity, will tend to move quite slowly and erratically, and may be controlled with virtually zero additional propellant by slightly adjusting the locations and difference in magnitudes of the double-burn manoeuvres that are performed to control the argument of perigee.

Of the two "out-of-plane" classic elements, the inclination will also tend to change quite slowly, and because it is not a critical parameter it will not need to be controlled. The RAAN, like the argument of perigee, will tend to change at a fairly constant rate, resulting in a slow but steady precession of the orbit plane about the North Pole. The sign and magnitude of the RAAN rate will determined by the inclination and initial RAAN value. For the preferred configuration with two or more satellites in the same orbit plane, the precession of the orbit plane will not affect the coverage of the polar region, so no manoeuvres will be required to control the RAAN. (Note that the effect of a small, constant rate in the RAAN on the coverage at any point on the ground can be easily compensated for by slightly offsetting the average orbit period from exactly one sidereal day to maintain a fixed ground track.) For a constellation in which satellites are maintained in two or more orbit planes, infrequent "cross-track" manoeuvres may be performed at the orbit apogees to maintain the nodal separation between planes.

Radiation

Orbits selected for this invention allow the satellites to avoid the inner Van Allen radiation belt of high energy protons. The satellites in this orbit will still pass through the less severe outer radiation belt of electrons. Proton particles are much heavier than electron particles thus they can create much more damage. It is difficult if not impossible to shield against high energy protons.

As the satellite passes through these radiation zones, there is a cumulative radiation absorption by the satellite components. This accumulative absorption is one factor in determining the design life of a satellite. The second factor, which occurs as a result of the proton belt but not the electron belt, is called the Single Event Effect (SEE) caused by a single energetic particle. The particle can cause a temporary upset in the electronics or permanent damage. The orbits of the invention have been specially designed to achieve global coverage with six satellites, while avoiding the Van Allen proton radiation belts.

Figure 17:
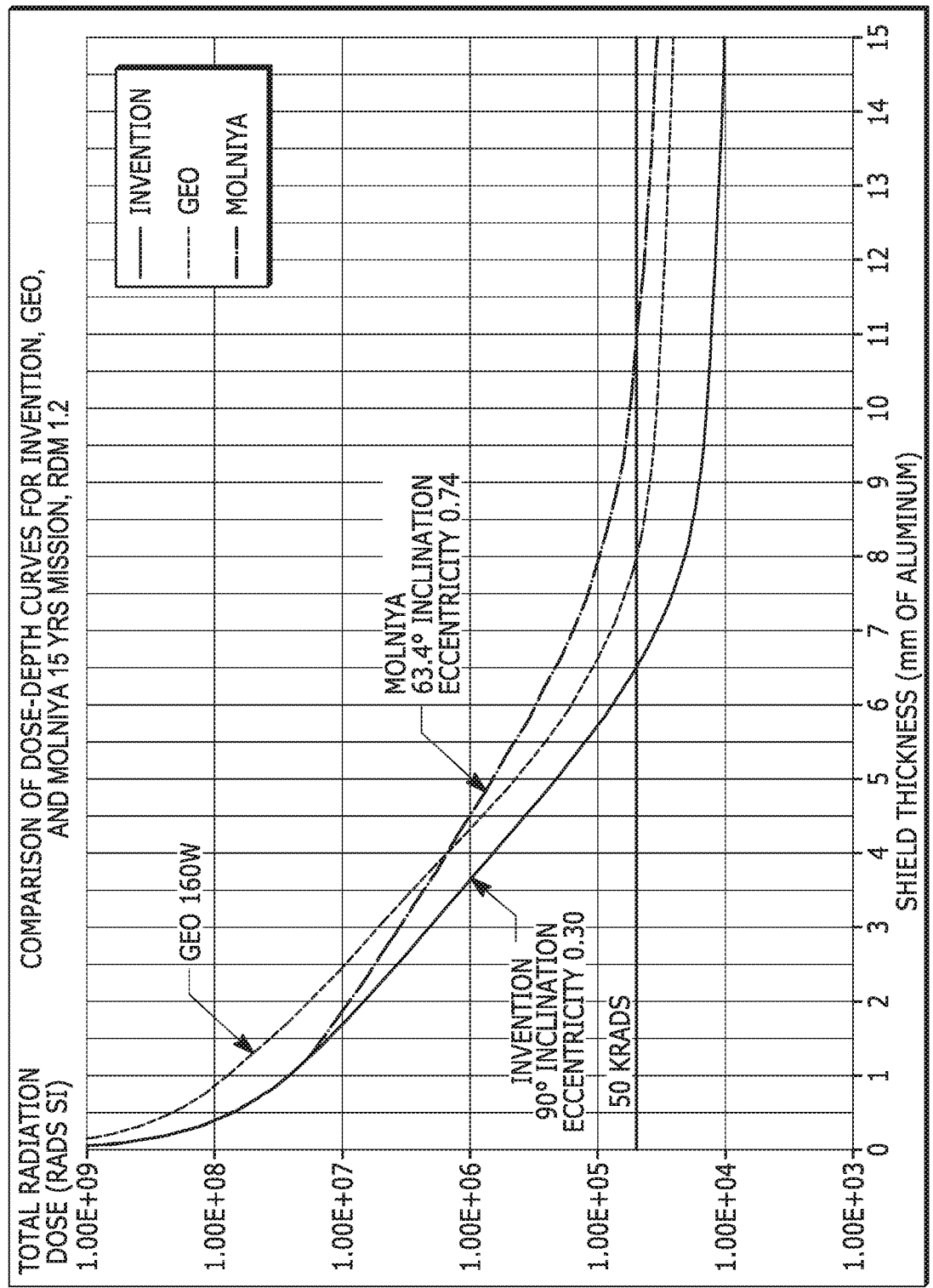
FIGS. 17 and 18 are graphs which show the Total Ionizing Dose (TID) for the orbit of the invention to be less than those of geostationary and Molniya orbits.
Figure 18:
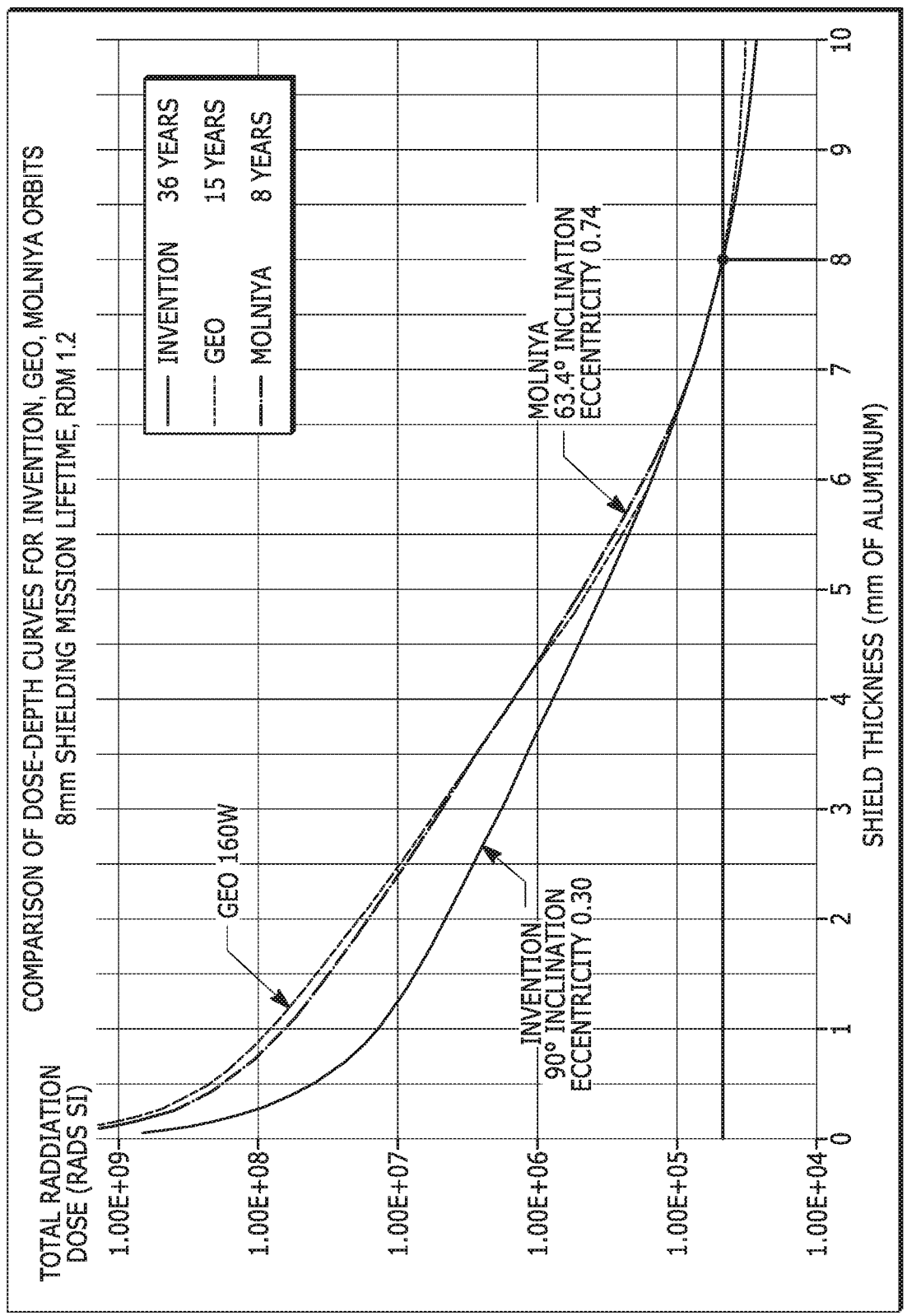

FIGS. 17 and 18 present dose-depth curves comparing three orbits: a 90° inclination/0.3 eccentricity orbit in the manner of the invention; a GEO 160 W orbit (i.e. a geosynchronous orbit sitting at 160° West); and, a classic Molniya orbit (63.4° inclination, eccentricity of 0.74). During a 15 year design life of a typical GEO satellite, the total accumulated radiation that is expected to be absorbed is 50 krads. As shown in FIG. 17, a satellite in the Molniya orbit would require a shield thickness of 11.5 mm to satisfy this requirement, while a GEO 160 W would require 8 mm of aluminum shielding. In contrast, the orbit of the invention would only require 6.5 mm. There is a significant advantage in using an orbit like that of the invention, which can use components and subsystems with flight heritage in GEO, and can achieve or exceed the design life of GEO satellites.

It is preferable to use "off the shelf" components in order to minimize costs and optimize reliability. While one could implement the invention with new components having 6.5 mm shielding, one would typically use 8 mm shielding because GEO satellites and components are the most common. As shown in FIG. 18, if one was to keep the shielding and total radiation absorbed for a GEO as a reference (i.e. a shielding of 8 mm and radiation dose of 50 krads), a satellite in the Molniya orbit will absorb this total radiation dose in 8 years, a satellite in the GEO orbit in 15 years and a satellite in a 90° inclination orbit of the invention, in 36 years. Thus, the system of the invention would be much more reliable and would have a much longer expected lifetime than a system in the Molniya orbit.

Figure 20:
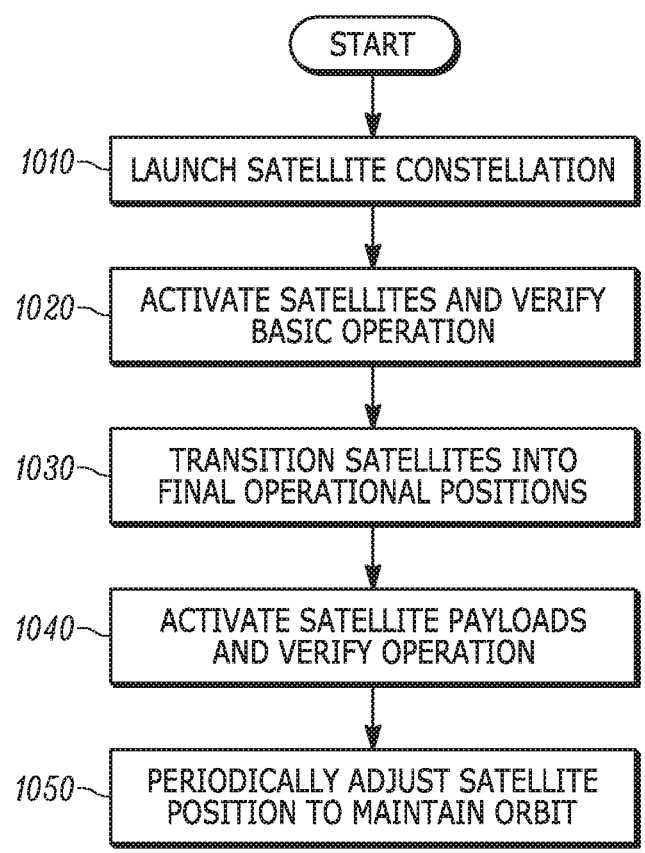
FIG. 20 presents a flow chart of an exemplary method of implementing the invention.

FIG. 20 illustrates a flowchart of an exemplary method of operating the satellite system. The method begins in block 1010, by launching the satellite constellation and deploying the satellites into orbits having the desired orbital parameters. Satellites may be launched one at a time (e.g. one satellite per launch vehicle) or with multiple satellites in the same launch vehicle. In the preferred embodiment, it is desirable to have all of the satellites in the same orbital plane; in such a configuration, it is most efficient to launch all of the satellites with a single launch vehicle.

Figure 19:
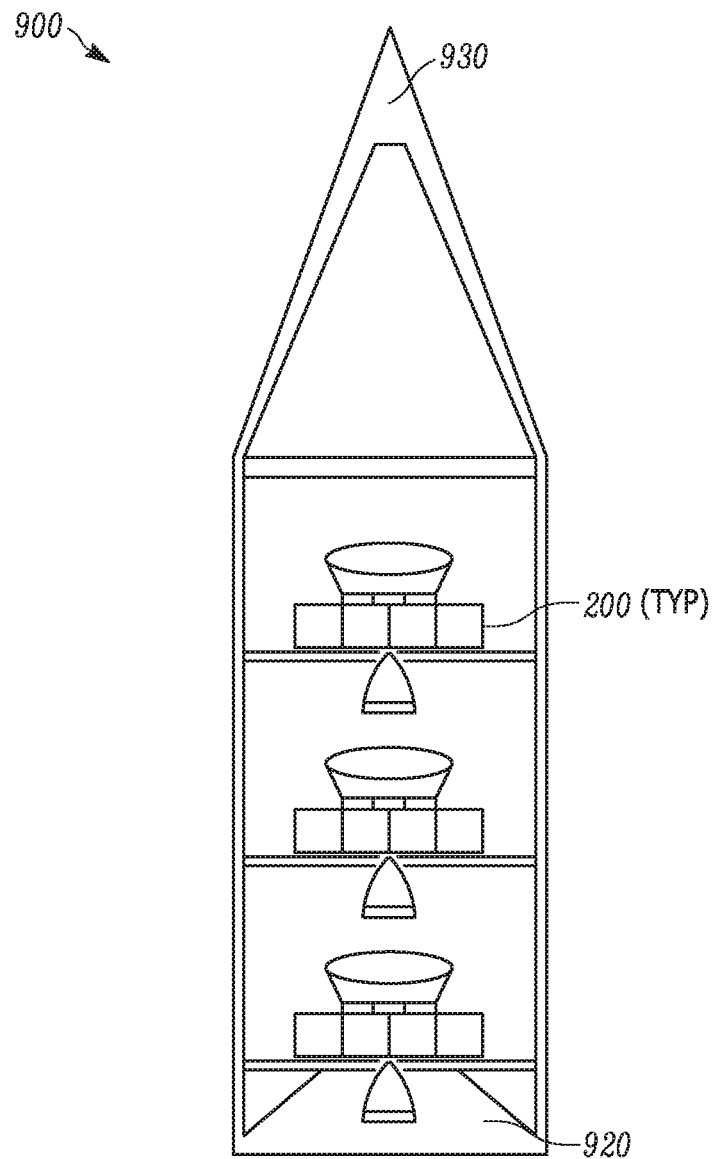
FIG. 19 presents an exemplary payload arrangement for a launch vehicle.

FIG. 19 presents a cross-sectional view of an exemplary payload 900 for a launch vehicle (not shown) containing three satellites 200. The launch vehicle will include a sufficient number of propulsion stages, of sufficient capacity, to carry the satellites into the desired orbit, or into a position from which the satellites can reach their operational orbits (i.e. two propulsion stages, three stages, etc.). The launch vehicle may carry multiple satellites into a low-altitude parking orbit, from which the satellites propel themselves into the operational orbit, or it may launch the satellites directly into their operational orbit.

FIG. 19 presents three satellites 200 stacked on a payload adaptor 920 within a payload fairing 930. While only three satellites are required in each of two planes, to provide global coverage, it may be desirable to launch a fourth, redundant satellite into the orbit at the same time as the three primary satellites in a given plane. Thus, the fourth, redundant satellite could be commissioned if any of the primary satellites fails for some reason. Of course, more or fewer satellites could be arranged within the payload fairing.

As will be described with respect to FIG. 22, each satellite 200 will include a communications system, a control system and a propulsion system. Regardless of what configuration of launch vehicle is used, these systems allow the satellites 200 to communicate with the Gateway 610, and position themselves into their final operation orbits, with the desired separation. In the case of a three satellite constellation with the satellites in the same plane, the three satellites will be 8 hours apart.

Referring again to FIG. 20, once the satellite constellation has been launched by the launch vehicle, the satellites may be activated and a commissioning/testing procedure of the basic systems performed 1020. This commissioning/testing procedure may include deploying antennas and rotating the satellite 200 so that the antenna is pointed in the appropriate direction, deploying solar panels, energizing processors and electronic systems, booting-up software systems, and verifying operation of all basic systems and subsystems. It may also be necessary to perform trouble-shooting and/or corrective measures as part of this procedure.

Once the basic systems and subsystems have been activated and their operation verified, the satellites 200 may be transitioned into their final orbital positions 1030. As described above, this may comprise the satellites 200 simply propelling themselves into the correct position within the orbital plane, if they were launched into the same operational orbit. Alternatively, if the satellites 200 were launched into a parking orbit, they may be required to consume a much larger quantity of fuel to propel themselves into their operational orbit and their required separation.

With the satellites 200 now in their final orbital positions, the payloads may be activated, commissioned and tested 1040. This would be done in much the same manner as the activation, testing and commissioning of the satellites' basic systems described above, i.e. deploying any necessary antennas or sensors, energizing processors and electronic systems, booting-up software systems, and verifying operation of all the payload systems and subsystems. Of course, trouble-shooting and/or corrective measures may also be performed as part of the payload commissioning procedure.

The satellites 200 are now in an operational mode. Operation of the payload will be determined completely by the nature of the payload. In the case of an Earth observation payload such as weather-monitoring system, this may comprise the operation of imaging instruments, and the transmission of observation data from the satellite to the Gateway.

With all of the satellite systems and payload operational, the only remaining concern is to maintain the position of the satellite 200 in the orbit of interest 1050. This can be effected in the manner described above under the heading "Orbit Control". Satellite position information may be determined by the satellite 200, a Gateway 610 or some other control center. Typically, satellite position information may be calculated from global positioning system (GPS) data and/or from other satellite telemetry.

Optionally, certain systems and subsystems may be deactivated in the course of the satellites' orbits, for example, to conserve power or to protect instrumentation. If, for example, the payload comprises scientific instruments for monitoring weather in the Northern circumpolar region it may be desirable to deactivate the payload systems while the satellite 200 is in the Southern hemisphere, re-activating it as it re-enters the region of interest. It may be desirable to keep the basic satellite subsystems operational at all times, so that it may continue to receive and transmit data related to its health, status and control.

Figure 21:
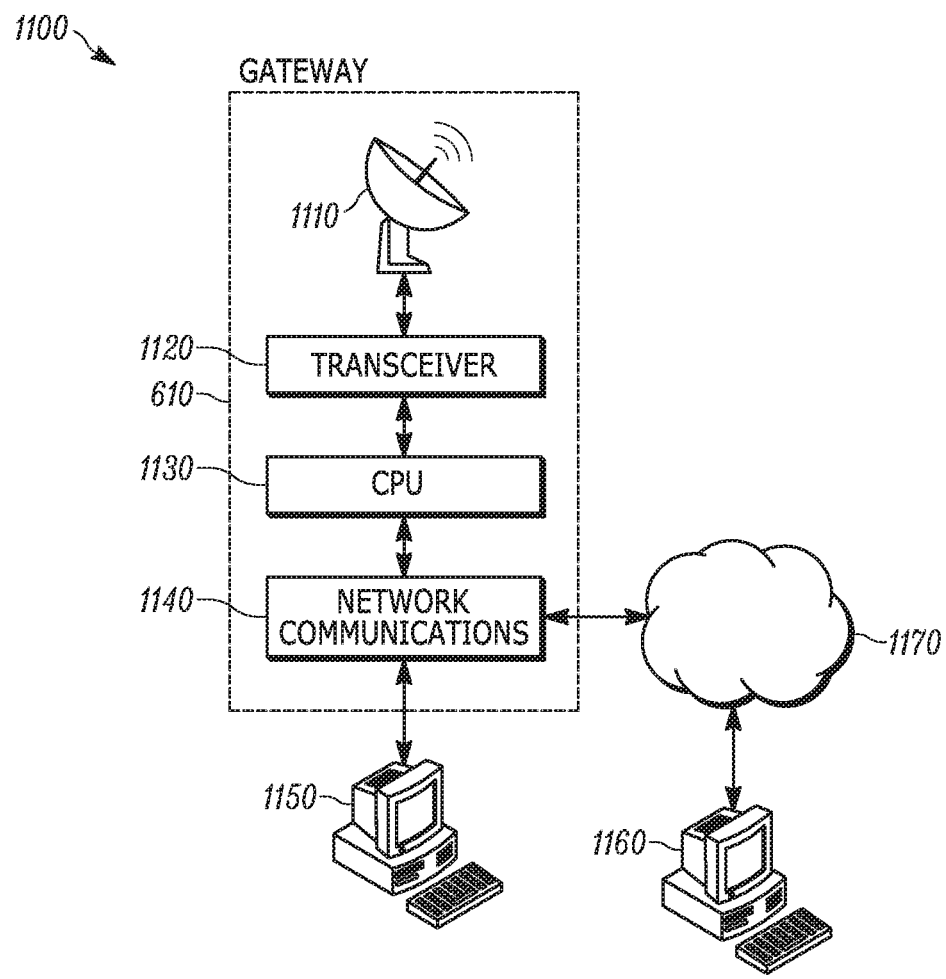
FIG. 21 presents a block diagram of an exemplary Gateway in an embodiment of the invention.

FIG. 21 illustrates a simplified block diagram of an exemplary Gateway system 1100 for communicating with the satellites 200. The communication signals may include operational/control signals and payload related signals. In the case of a scientific payload, the payload related signals may include control signals transmitted to instruments, and observation monitoring data received from the instruments. The Gateway system 1100 may be modified to receive and present other types of information, and may be used in conjunction with one or more computers, servers, networks and other related devices.

As shown in FIG. 21, the Gateway system 1100 may include an antenna 1110, a transceiver 1120, a processing unit or system 1130, and a network communications system 1140.

The antenna 1110 is designed to receive and transmit signals at the desired communication frequencies. Typically, the antenna 1110 will be a highly-directional, tracking antenna, given the high altitudes of the satellites and the low signal levels involved. Other antenna designs such as non-tracking antennas may be used if the application is changed.

The Gateway transceiver 1120 consists of a receiver portion for receiving data from the satellites and preparing it for the CPU 1130, and a transmission portion for process data from the CPU 1130, preparing it for transmission to the satellites 200 via the antenna 1110. The transmitting portion of the transceiver 1120 may, for example, multiplex, encode and compress data to be transmitted to the satellites 200, then modulate the data to the desired transmission frequency and amplify it for transmission. Multiple channels may be used, error correction coding, and the like. In a complementary manner, the receiver portion of the transceiver 1120 demodulates received signals and performs any necessary demultiplexing, decoding, decompressing, error correction and formatting of the signals from the antenna, for use by the CPU 1130. The antenna and/or receiver may also include any other desired switches, filters, low-noise amplifiers, downconverters (for example, to an intermediate frequency), and other components.

A local user interface 1150 is also shown in FIG. 21. The geographic positions of the Gateway(s) 610 may be chosen to minimize the number of Gateways required. As a result, the Gateway(s) 610 may not be in a geographic location that is convenient for the satellite operators and/or parties receiving the payload data. Thus, the Gateway(s) 610 will typically be provided with network communication facilities 1140 so that remote computers 1160 may be used to access the system over the Internet or similar networks 1170.

Figure 22:
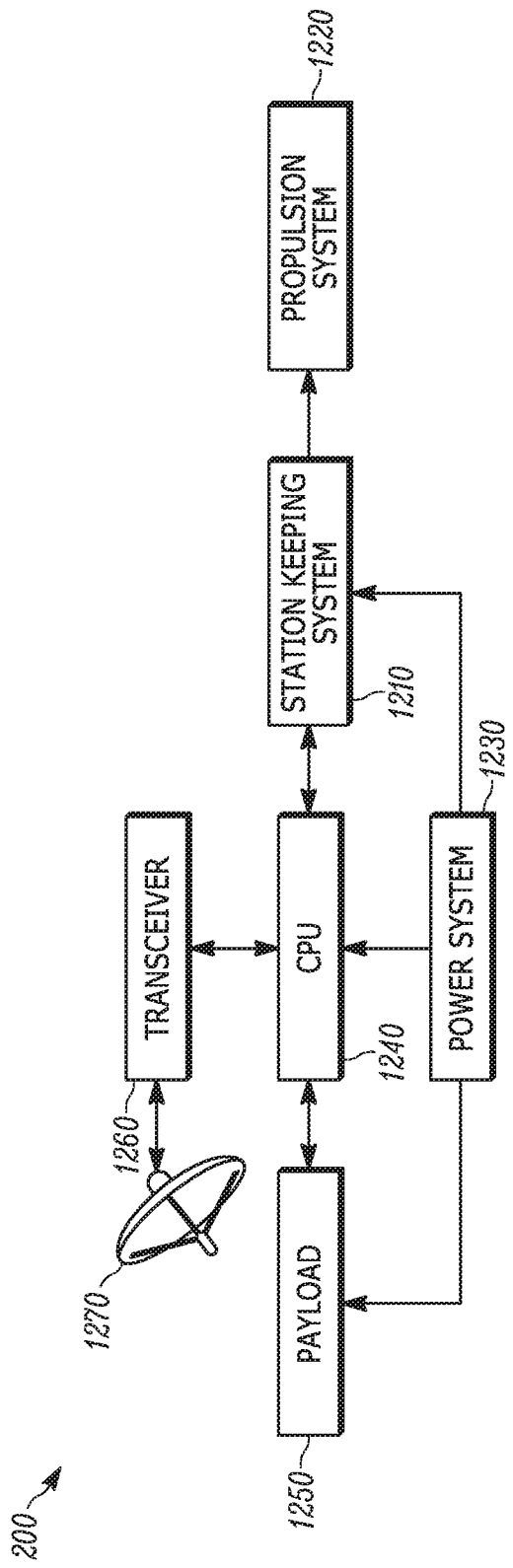
FIG. 22 presents a block diagram of an exemplary satellite in an embodiment of the invention.

FIG. 22 illustrates a simplified block diagram of a satellite 200 which may be used in an exemplary embodiment of the invention. As shown, the satellite 200 may include a stationkeeping system 1210, a propulsion system 1220, a power system 1230, a communications system, a computer processing system 1240 and a payload 1250. The communications system will typically consist of a transceiver 1260 and an antenna 1270. Of course, other components and arrangements may be used to implement the invention, including, for example, redundant and back-up components.

The stationkeeping subsystem 1210 is responsible for maintaining the satellite's orbit. Accordingly, the stationkeeping subsystem 1210 may calculate and/or receive attitude and/or orbit adjustment information, and may actuate the propulsion system to adjust the satellite's attitude and/or orbit. Maintaining the orbit may also include maintaining the desired separations between itself and the other satellites within the satellite constellation. The propulsion system 1220 may include for example, a fuel source (i.e. fuel and oxidant tanks) and liquid fuel rocket, or an ion-thruster system.

The power subsystem 1230 provides electrical power to all of the satellite systems and subsystems. The power subsystem 1230 may, for example, include one or more solar panels and a supporting structure, and one or more batteries.

The satellite antenna 1270 would be designed to accommodate the communications frequencies and systems required. In view of the physical size and weight constraints of the satellite, it will be much smaller than the antenna 1110 of the Gateway 610. The direction of the beam of antenna 1270 is controlled by mechanically steering the antenna or electronically steering the antenna beam. Alternatively, the satellite attitude may be controlled to steer the antenna.

Similarly, the satellite transceiver 1280 is designed to be complementary to that of the Gateway 610, consisting of a receiver portion for receiving data from the Gateway 610 and preparing it for the CPU 1240, and a transmission portion for process data from the CPU 1240, preparing it for transmission to the Gateway 610 via the antenna 1270. The transmitting portion of the transceiver 1260 may, for example, multiplex, encode and compress data to be transmitted, then modulate the data to the desired transmission frequency and amplify it for transmission. Multiple channels may be used, error correction coding, and the like. The receiver portion of the transceiver 1260 demodulates received signals and performs any necessary demultiplexing, decoding, decompressing, error correction and formatting of the signals from antenna 1270, for use by the satellite CPU 1240. The antenna and/or receiver may also include any other desired switches, filters, low-noise amplifiers, downconverters (for example, to an intermediate frequency and/or baseband), and other components.

The CPU system 1240 of the satellite 200 typically receives signals used for operation of the attitude and orbit control systems. It also receives control signals for operation of the payload 1250, and processes payload data for transmission to the Gateway 610. It may also manage activation and deactivation of the various subsystems as the satellite 200 passes into and out of the geographic region of interest.

Options and Alternatives

In addition to the meteorological implementations described above, the system of the invention may be applied to at least the following applications:

1. Military UAVs (unmanned aerial vehicles): the current requirement for Military UAVs specifies that an uplink rate of 10-20 Mbps (megabits per second) be supported. This can be accommodated globally by the system of the invention;

2. Cross polar air traffic currently must switch from geostationary communications to HF (high frequency) radio communications while going over the poles. The system of the invention could support broadband communications, navigation and surveillance with aircraft crossing the pole. There are currently 700 aircraft per month using polar routes and continuous coverage over the north circumpolar region is required to improve safety and efficiency of air traffic in the area;

3. Satellite based navigation augmentation: accuracy, integrity and reliability of satellite based navigation systems (e.g. GPS) can be improved by augmenting or overlaying their signals with those from other satellites which broadcast error corrections and integrity information. This is particularly important for air traffic. Two such systems are in place, one in the United States (Wide Area Augmentation System) and one in Europe (European Geostationary Navigation Overlay System). Both are based on geostationary satellites systems and neither covers the entire circumpolar regions where there is a recognized need for improved navigation;

4. Earth Observation: In addition to meteorological observations, other Earth observation payloads can perform well in the described orbits and provide global monitoring including hyperspectral sounders and ocean colour radiometry;

5. Space Situational Awareness: These payloads can detect space hazards such as debris and asteroids as well as other satellites which may be considered hazards;

6. Space Weather: The orbits of the invention can support space weather payloads which measure such factors as solar radiation. Van Allen belt radiation, and the Earth's ionosphere; and 7. Inter Satellite Link (ISL): The ISL links is a derived feature of this invention. The satellite will be capable of providing ISL links to other satellites that will behave as a relay station to communicate with the terrestrial infrastructure.

CONCLUSIONS

One or more currently preferred embodiments have been described by way of example. It will be apparent to persons skilled in the art that a number of variations and modifications can be made without departing from the scope of the invention as defined in the claims. For example, the selection of the inclination is dependent on the tradeoffs between the required service area, the amount of fuel on the spacecraft and the launch mass of the payload. These parameters can be optimized to accommodate different priorities, without departing from the concept of the invention.

The method steps of the invention may be embodied in sets of executable machine code stored in a variety of formats such as object code or source code. Such code may be described generically as programming code, software, or a computer program for simplification. The embodiments of the invention may be executed by a computer processor or similar device programmed in the manner of method steps, or may be executed by an electronic system which is provided with means for executing these steps. Similarly, an electronic memory medium such computer diskettes, hard drives, thumb drives, CD-ROMs, Random Access Memory (RAM), Read Only Memory (ROM) or similar computer software storage media known in the art, may be programmed to execute such method steps.

All citations are hereby incorporated by reference.

What is claimed is:

1. A satellite system for global coverage comprising:
a constellation of six satellites, three of said satellites orbiting in a first orbit and the other three of said satellites orbiting in a second orbit;
at least one base station being configured to transmit to, and receive signals from said constellation of six satellites;
a flight control system for controlling said constellation of six satellites such that:
the first orbit has an orbital inclination between 70° and 90°, an apogee over the northern hemisphere, a perigee that avoids an inner Van Allen belt of high energy protons, and an orbital eccentricity of greater than 0.28 and less than 0.45;
the second orbit has an orbital inclination between 70° and 90°, an apogee over the southern hemisphere, a perigee that avoids the inner Van Allen belt of high energy protons, and an orbital eccentricity of greater than 0.28 and less than 0.45; and
a major axis of the first orbit is substantially aligned with a major axis of the second orbit, and planes of the first orbit and the second orbit being orthogonal to one another.

2. The system of claim 1 wherein the orbital eccentricity and the orbital inclination of each of the first and second orbits are selected to provide 99% global coverage, with an elevation angle of at least 10°.

3. The system of claim 1, wherein the orbital inclination of each of the first and second orbits is between 80° and 90°.

4. The system of claim 1, wherein the orbital inclination of each of the first and second orbits is 90°.

5. The system of claim 1, wherein the orbital eccentricity and the orbital inclination of each of the first and second orbits are selected to provide continuous global coverage, with an elevation angle of at least 8.7°.

6. The system of claim 1, wherein the orbital eccentricity of each of the first and second orbits is between 0.30 and 0.34.

7. The system of claim 1, wherein the satellites have an orbital period of one sidereal day.

8. The system of claim 1, wherein phasing of the satellites is such that a time between their respective apogees is an orbital period divided by a number of satellites in the constellation.

9. The system of claim 1, wherein changes in satellite orbital perturbations are compensated for by on-board propulsion systems.

10. The system of claim 1, wherein directional antennas are used for communications between the satellites and the base station.

11. The system of claim 1, wherein the base station is operable to track the satellites across the sky.

12. The system of claim 1, wherein the base station is operable to hand off communications between the satellites as they move across the sky.

13. The system of claim 1, wherein the satellites include a meteorological monitoring payload.

14. The system claim 1, wherein the satellites include a communications payload.

15. The system of claim 1, wherein the satellites include a scientific research payload.

16. The system of claim 1, wherein the orbital eccentricity and the orbital inclination of each of the first and second orbits are selected to result in a 50 krad radiation exposure over 15 years, allowing the use of conventional GEO satellite shielding.

17. A method of operation for a satellite system for Earth observation and communications having global coverage, comprising:
providing a constellation of six satellites, three of said satellites orbiting in a first orbit and the other three of said satellites orbiting in a second orbit;
the first orbit having an orbital inclination between 70° and 90°, an apogee over the northern hemisphere, a perigee that avoids an inner Van Allen belt of high energy protons, and an orbital eccentricity of greater than 0.28 and less than 0.45;
the second orbit having an orbital inclination between 70° and 90°, an apogee over the southern hemisphere, a perigee that avoids the inner Van Allen belt of high energy protons, and an orbital eccentricity of greater than 0.28 and less than 0.45; and
a major axis of the first orbit being substantially aligned with a major axis of the second orbit, and planes of the first orbit and the second orbit being orthogonal to one another; and
providing at least one base station for transmitting to and receiving signals from said constellation of six satellites.

18. The method of claim 17, wherein the orbital inclination of each of the first and second orbits is between 80° and 90°.

19. The method of claim 17, wherein the orbital eccentricity of each of the first and second orbits is between 0.30 and 0.34.

20. The method of claim 17, wherein the satellites have an orbital period of one sidereal day.

21. The method of claim 17, wherein phasing of the satellites is such that a time between their respective apogees is an orbital period divided by a number of satellites in the constellation.

22. A satellite base station, comprising:
a communication system for transmitting and receiving signals to and from a constellation of six satellites providing global coverage; and
a flight control system for controlling said constellation of six satellites such that:
three of said satellites orbit in a first orbit and the other three of said satellites orbit in a second orbit;
the first orbit having an orbital inclination between 70° and 90° with respect to a first pole of the Earth, an orbital eccentricity of greater than 0.28 and less than 0.45, and a perigee that avoids an inner Van Allen belt of high energy protons;
the second orbit having an orbital inclination between 70° and 90° with respect to a second pole of the Earth, an orbital eccentricity of greater than 0.28 and less than 0.45, and a perigee that avoids the inner Van Allen belt of high energy protons; and
a major axis of the first orbit being substantially aligned with a major axis of the second orbit, and planes of the first orbit and the second orbit being orthogonal to one another.

23. The satellite base station of claim 22, wherein the orbital inclination of each of the first and second orbits is between 80° and 90°.

24. The satellite base station of claim 22, wherein the orbital eccentricity of each of the first and second orbits is between 0.30 and 0.34.

25. The satellite base station of claim 22, wherein the satellites have an orbital period of one sidereal day.

26. The satellite base station of claim 22, wherein phasing of the satellites is such that a time between their respective apogees is an orbital period divided by a number of satellites in the constellation.

* * * * *